(12) United States Patent
Smith et al.

(10) Patent No.: US 9,632,315 B2
(45) Date of Patent: Apr. 25, 2017

(54) HEAD-MOUNTED DISPLAY APPARATUS EMPLOYING ONE OR MORE FRESNEL LENSES

(75) Inventors: David Alan Smith, Cary, NC (US); Gary E. Wiese, Orlando, FL (US); Glenn Clark Cuddihy, Orlando, FL (US); Gregory A. Harrison, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 696 days.

(21) Appl. No.: 13/211,365

(22) Filed: Aug. 17, 2011

(65) Prior Publication Data

US 2012/0120498 A1    May 17, 2012

Related U.S. Application Data

(60) Provisional application No. 61/405,440, filed on Oct. 21, 2010, provisional application No. 61/417,325, (Continued)

(51) Int. Cl.
*G02B 27/14* (2006.01)
*G09G 5/00* (2006.01)
(Continued)

(52) U.S. Cl.
CPC .......... *G02B 27/0172* (2013.01); *G02B 3/08* (2013.01); *G02B 27/0093* (2013.01); (Continued)

(58) Field of Classification Search
USPC .................................. 359/629–632; 345/7–9
See application file for complete search history.

(56) References Cited

U.S. PATENT DOCUMENTS

| 3,880,509 A | 4/1975 | Herndon et al. |
| 4,026,641 A | 5/1977 | Bosserman et al. |

(Continued)

FOREIGN PATENT DOCUMENTS

| CA | 2750287 A1 | 11/2011 |
| CA | 2750287 C | 7/2012 |

(Continued)

OTHER PUBLICATIONS

International Search Report, EPO, Sep. 14, 2012.
(Continued)

*Primary Examiner* — Alicia M Harrington
(74) *Attorney, Agent, or Firm* — Withrow + Terranova, PLLC

(57) ABSTRACT

Head-mounted displays (100) are disclosed which include a frame (107), an image display system (110) supported by the frame (107), and a Fresnel lens system (115) supported by the frame (107). The HMD (100) can employ a reflective optical surface, e.g., a free-space, ultra-wide angle, reflective optical surface (a FS/UWA/RO surface) (120), supported by the frame (107), with the Fresnel lens system (115) being located between the image display system (110) and the reflective optical surface (120). The Fresnel lens system (115) can include at least one curved Fresnel lens element (820). Fresnel lens elements (30) for use in HMDs are also disclosed which have facets (31) separated by edges (32) which lie along radial lines (33) which during use of the HMD pass through a center of rotation (34) of a nominal user's eye (35) or through the center of the eye's lens (36) or are normal to the surface of the eye's cornea.

24 Claims, 16 Drawing Sheets

Related U.S. Application Data filed on Nov. 26, 2010, provisional application No. 61/417,326, filed on Nov. 26, 2010, provisional application No. 61/417,327, filed on Nov. 26, 2010, provisional application No. 61/417,328, filed on Nov. 26, 2010, provisional application No. 61/427,530, filed on Dec. 28, 2010.

(51) Int. Cl.

| | | |
|---|---|---|
| *G02B 27/01* | (2006.01) | |
| *G02B 3/08* | (2006.01) | |
| *G02B 27/00* | (2006.01) | |
| *G02B 27/30* | (2006.01) | |
| *G06F 3/01* | (2006.01) | |
| *G06T 19/00* | (2011.01) | |

(52) U.S. Cl.
CPC ............. *G02B 27/30* (2013.01); *G06F 3/012* (2013.01); *G06T 19/006* (2013.01); *G02B 2027/013* (2013.01); *G02B 2027/0123* (2013.01); *G02B 2027/0178* (2013.01)

(56) References Cited

U.S. PATENT DOCUMENTS

| | | |
|---|---|---|
| 5,184,250 A | 2/1993 | Lacroix |
| 5,309,169 A | 5/1994 | Lippert |
| 5,325,386 A | 6/1994 | Jewell et al. |
| 5,347,400 A | 9/1994 | Hunter |
| 5,388,990 A | 2/1995 | Beckman |
| 5,561,538 A | 10/1996 | Kato et al. |
| 5,572,343 A | 11/1996 | Okamura et al. |
| 5,581,271 A | 12/1996 | Kraemer |
| 5,699,194 A | 12/1997 | Takahashi |
| 5,701,132 A | 12/1997 | Kollin et al. |
| 5,701,202 A | 12/1997 | Takahashi et al. |
| 5,712,649 A | 1/1998 | Tosaki et al. |
| 5,715,094 A | 2/1998 | Ansley et al. |
| 5,754,344 A | 5/1998 | Fujiyama |
| 5,757,544 A | 5/1998 | Tabata et al. |
| 5,774,268 A | 6/1998 | Takahashi |
| 5,798,738 A | 8/1998 | Yamada |
| 5,798,739 A | 8/1998 | Teitel et al. |
| 5,803,738 A | 9/1998 | Latham |
| 5,834,676 A | 11/1998 | Elliott |
| 5,844,530 A | 12/1998 | Tosaki |
| 5,982,343 A | 11/1999 | Iba et al. |
| 5,999,147 A | 12/1999 | Teitel |
| 6,038,387 A | 3/2000 | Machida |
| 6,140,979 A | 10/2000 | Gerhard et al. |
| 6,140,980 A | 10/2000 | Spitzer et al. |
| 6,160,666 A | 12/2000 | Rallison et al. |
| 6,185,045 B1 | 2/2001 | Hanano |
| 6,201,646 B1 | 3/2001 | Togino et al. |
| 6,215,593 B1 | 4/2001 | Bruce |
| 6,266,194 B1 | 7/2001 | Tanijiri |
| 6,445,362 B1 | 9/2002 | Tegreene |
| 6,522,474 B2 | 2/2003 | Cobb et al. |
| 6,529,331 B2 | 3/2003 | Massof et al. |
| 6,549,332 B2 | 4/2003 | Kimura |
| 6,611,253 B1 | 8/2003 | Cohen |
| 6,633,304 B2 | 10/2003 | Anabuki et al. |
| 6,646,811 B2 | 11/2003 | Inoguchi |
| 6,704,128 B2 | 3/2004 | Takeyama et al. |
| 6,731,434 B1 | 5/2004 | Hua et al. |
| 6,751,026 B2 | 6/2004 | Tomono |
| 6,771,423 B2 | 8/2004 | Geist |
| 6,795,042 B1 | 9/2004 | Nagata et al. |
| 6,813,085 B2 | 11/2004 | Richards |
| 6,829,087 B2 | 12/2004 | Freese et al. |
| 6,873,471 B2 | 3/2005 | Coates |
| 6,919,866 B2 | 7/2005 | Kanevsky et al. |
| 6,919,867 B2 | 7/2005 | Sauer |
| 6,963,379 B2 | 11/2005 | Tomono |
| 7,002,551 B2 | 2/2006 | Azuma et al. |
| 7,009,773 B2 | 3/2006 | Chaoulov et al. |
| 7,063,256 B2 | 6/2006 | Anderson et al. |
| 7,072,096 B2 | 7/2006 | Holman et al. |
| 7,088,516 B2 | 8/2006 | Yagi et al. |
| 7,095,562 B1 | 8/2006 | Peng |
| 7,110,013 B2 | 9/2006 | Ebersole et al. |
| 7,119,965 B1 | 10/2006 | Rolland et al. |
| 7,151,639 B2 | 12/2006 | Lung |
| 7,295,377 B2 * | 11/2007 | Edelmann ..................... 359/630 |
| 7,307,791 B2 | 12/2007 | Li et al. |
| 7,324,081 B2 | 1/2008 | Friedrich et al. |
| 7,339,742 B2 | 3/2008 | Amitai et al. |
| 7,385,600 B2 | 6/2008 | Marion |
| 7,391,573 B2 | 6/2008 | Amitai |
| 7,432,879 B2 | 10/2008 | Schonlau |
| 7,446,941 B2 | 11/2008 | Fukuda |
| 7,499,217 B2 | 3/2009 | Cakmakci et al. |
| 7,545,571 B2 | 6/2009 | Garoutte et al. |
| 7,573,525 B2 | 8/2009 | Yamasaki |
| 7,605,773 B2 | 10/2009 | Janssen |
| 7,613,356 B2 | 11/2009 | Uchiyama et al. |
| 7,623,294 B2 | 11/2009 | Harada et al. |
| 7,626,562 B2 | 12/2009 | Iwasaki |
| 7,732,694 B2 | 6/2010 | Rosenberg |
| 7,751,122 B2 | 7/2010 | Amitai |
| 7,804,507 B2 | 9/2010 | Yang et al. |
| 7,812,815 B2 | 10/2010 | Banerjee et al. |
| 7,843,403 B2 | 11/2010 | Spitzer |
| 7,928,927 B1 | 4/2011 | Krenz et al. |
| 7,949,295 B2 | 5/2011 | Kumar et al. |
| 8,046,719 B2 | 10/2011 | Skourup et al. |
| 8,059,342 B2 | 11/2011 | Burke |
| 8,928,558 B2 | 1/2015 | Lewis et al. |
| 8,964,298 B2 | 2/2015 | Haddick et al. |
| 2001/0033401 A1 | 10/2001 | Kasai et al. |
| 2001/0043163 A1 | 11/2001 | Waldern et al. |
| 2002/0036649 A1 | 3/2002 | Kim et al. |
| 2002/0047987 A1 | 4/2002 | Massengill et al. |
| 2002/0094189 A1 | 7/2002 | Navab et al. |
| 2002/0163486 A1 | 11/2002 | Ronzani et al. |
| 2002/0181115 A1 | 12/2002 | Massof et al. |
| 2002/0186179 A1 | 12/2002 | Knowles |
| 2002/0196554 A1 * | 12/2002 | Cobb et al. ..................... 359/633 |
| 2004/0130783 A1 | 7/2004 | Solomon |
| 2004/0174599 A1 | 9/2004 | Dietrich |
| 2005/0046953 A1 | 3/2005 | Repetto et al. |
| 2006/0072215 A1 | 4/2006 | Nishi |
| 2006/0103590 A1 | 5/2006 | Divon |
| 2006/0281061 A1 | 12/2006 | Hightower et al. |
| 2007/0020587 A1 | 1/2007 | Seymore et al. |
| 2007/0097277 A1 | 5/2007 | Hong et al. |
| 2007/0132785 A1 | 6/2007 | Ebersole et al. |
| 2007/0177275 A1 * | 8/2007 | McGuire ..................... 359/630 |
| 2007/0219760 A1 | 9/2007 | Yang et al. |
| 2007/0236800 A1 | 10/2007 | Cakmakci et al. |
| 2007/0243916 A1 | 10/2007 | Lee |
| 2008/0007181 A1 | 1/2008 | Pickering |
| 2008/0123049 A1 | 5/2008 | Volk |
| 2008/0130309 A1 | 6/2008 | Condon et al. |
| 2008/0204731 A1 | 8/2008 | Williams |
| 2008/0309586 A1 | 12/2008 | Vitale |
| 2009/0002574 A1 | 1/2009 | Sorek et al. |
| 2009/0015735 A1 | 1/2009 | Simmonds |
| 2009/0122385 A1 | 5/2009 | Hilton |
| 2009/0153437 A1 | 6/2009 | Aharoni |
| 2009/0228251 A1 | 9/2009 | Cakmakci et al. |
| 2010/0002154 A1 | 1/2010 | Hua |
| 2010/0060551 A1 | 3/2010 | Sugiyama et al. |
| 2010/0103075 A1 | 4/2010 | Kalaboukis et al. |
| 2010/0103196 A1 | 4/2010 | Kumar et al. |
| 2010/0149073 A1 | 6/2010 | Chaum et al. |
| 2010/0171680 A1 | 7/2010 | Lapidot et al. |
| 2010/0214635 A1 | 8/2010 | Sasaki et al. |
| 2010/0238161 A1 | 9/2010 | Varga et al. |
| 2010/0245387 A1 | 9/2010 | Bachelder et al. |
| 2010/0277575 A1 | 11/2010 | Ismael et al. |
| 2010/0279255 A1 | 11/2010 | Williams, II |
| 2010/0321409 A1 | 12/2010 | Komori et al. |

(56) References Cited

U.S. PATENT DOCUMENTS

| | | |
|---|---|---|
| 2011/0018903 A1 | 1/2011 | Lapstun et al. |
| 2011/0057863 A1 | 3/2011 | Sugihara et al. |
| 2011/0130636 A1 | 6/2011 | Daniel et al. |
| 2011/0202306 A1 | 8/2011 | Eng et al. |
| 2011/0213664 A1 | 9/2011 | Osterhout et al. |
| 2011/0214082 A1 | 9/2011 | Osterhout et al. |
| 2011/0221656 A1 | 9/2011 | Haddick et al. |
| 2011/0221657 A1 | 9/2011 | Haddick et al. |
| 2011/0221658 A1 | 9/2011 | Haddick et al. |
| 2011/0221659 A1 | 9/2011 | King, III et al. |
| 2011/0221668 A1 | 9/2011 | Haddick et al. |
| 2011/0221669 A1 | 9/2011 | Shams et al. |
| 2011/0221670 A1 | 9/2011 | King, III et al. |
| 2011/0221671 A1 | 9/2011 | King, III et al. |
| 2011/0221672 A1 | 9/2011 | Osterhout et al. |
| 2011/0221793 A1 | 9/2011 | King, III et al. |
| 2011/0221896 A1 | 9/2011 | Haddick et al. |
| 2011/0221897 A1 | 9/2011 | Haddick et al. |
| 2011/0222745 A1 | 9/2011 | Osterhout et al. |
| 2011/0225536 A1 | 9/2011 | Shams et al. |
| 2011/0227812 A1 | 9/2011 | Haddick et al. |
| 2011/0227813 A1 | 9/2011 | Haddick et al. |
| 2011/0227820 A1 | 9/2011 | Haddick et al. |
| 2011/0231757 A1 | 9/2011 | Haddick et al. |
| 2011/0250962 A1 | 10/2011 | Feiner et al. |
| 2012/0050144 A1 | 3/2012 | Morlock |
| 2012/0120499 A1 | 5/2012 | Harrison et al. |
| 2012/0154920 A1 | 6/2012 | Harrison et al. |
| 2012/0212400 A1 | 8/2012 | Border et al. |
| 2012/0326948 A1 | 12/2012 | Crocco et al. |
| 2013/0163090 A1 | 6/2013 | Yu |

FOREIGN PATENT DOCUMENTS

| | | |
|---|---|---|
| DE | 102007009828 A1 | 9/2008 |
| EP | 1418458 A1 | 5/2004 |
| GB | 2461907 A | 1/2010 |
| JP | 05-303054 A | 11/1993 |
| JP | H07-134266 A | 5/1995 |
| JP | H07225790 A | 8/1995 |
| JP | H07-244246 A | 9/1995 |
| JP | H08-190072 A | 7/1996 |
| JP | 08-278476 A | 10/1996 |
| JP | 10-080575 A | 3/1998 |
| JP | 10-206786 A | 8/1998 |
| JP | 2000047138 A | 2/2000 |
| JP | 2002287077 A | 10/2002 |
| JP | 2006039359 A | 2/2006 |
| JP | 2006091477 A | 4/2006 |
| JP | 2008058461 A | 3/2008 |
| JP | 2008529064 A | 7/2008 |
| JP | 2009069364 A | 4/2009 |
| JP | 2009232133 A | 10/2009 |
| JP | 2010020065 A | 1/2010 |
| JP | 2011133633 A | 7/2011 |
| TW | I244318 B | 11/2005 |
| WO | 9722964 A1 | 6/1997 |
| WO | 2005017729 A2 | 2/2005 |
| WO | 2008051578 A2 | 5/2008 |
| WO | 2009066408 A1 | 5/2009 |
| WO | 2009094643 A2 | 7/2009 |
| WO | 2010047212 A1 | 4/2010 |
| WO | 2010123934 A1 | 10/2010 |
| WO | 2011114149 A1 | 9/2011 |
| WO | 2012052980 A2 | 4/2012 |
| WO | 2012083042 A1 | 6/2012 |

OTHER PUBLICATIONS

Kiyokawa, Kiyoshi, "A Wide Field-of-View Head Mounted Projective Display Using Hyperbolic Half-Silvered Mirrors," IEEE, Nov. 16, 2007, Cybermedia Center, Osaka University, Osaka, Japan.

Jeon et al., "Mosaicing a Wide Geometric Field of View for Effective Interaction in Augmented Reality,"Mixed and Augmented Reality, 6th IEEE and ACM International Symposium, Mar. 2007, pp. 265-266.

Cakmakci et al., "Optical Free-Form Surfaces in Off-Axis Head-Worn Display Design," Mixed and Augmented Reality, 7th IEEE/ACM International Symposium; Mar. 2008, pp. 29-32.

Yang et al., "Hybrid Diffractive-Refractive 67°-Diagonal Field of View Optical See-Through Head-Mounted Display," Institute of Modern Optics, Aug. 17, 2005, pp. 351-355, vol. 116, No. 7, Optik—Internat, Nankai University, Tianjin, China.

Takeda et al., "Design and Implementation of a Wide Field-of-View Head Mounted Projective Display," Journal of the Institute of Image Information and Television Engineers, Jun. 2009, pp. 794-800, vol. 63, No. 6, Institute of Image Information and Television Engineers, Osaka, Japan.

Nagahara et al., Wide Field of View Catadioptrical Head Mounted Display, Transactions of the Institute of Electronics, Information and Communication Engineers D-II, Jan. 2005, pp. 95-104, vol. J88D-II, No. 1, Inst. Electron. Inf. & Commun. Eng, Japan.

Pratt, P. D., "Advanced Helmet Sight Reticle Assembly (AHRA)," Jul. 1976, p. 364, Honeywell Inc., Minneapolis Minn. Systems and Research Div.

Nagahara et al., "Wide Field of View Head Mounted Display for Tele-Presence with an Omnidirectional Image Sensor," Computer Vision and Pattern Recognition Workshop, Jun. 16-22, 2003, vol. 7, p. 86.

Takeda et al., "Poster: A Virtual Walkthrough System with a Wide Field-of-View Stereo Head Mounted Projective Display," 3D User Interfaces, IEEE Symposium, Mar. 14-15, 2009, p. 149, Lafayette, LA.

Mori et al., "A Wide-View Parallax-Free Eye-Mark Recorder with a Hyperboloidal Half-Silvered Mirror and Appearance-Based Gaze Estimation," Visualization and Computer Graphics, IEEE Transactions, Aug. 26, 2010, p. 1, vol. PP, No. 99.

Okuma et al., "An Augmented Reality System Using a Real-Time Vision Based Registration," Pattern Recognition, 1998. Proceedings. Fourteenth International Conference, Aug. 16-20, 1998, p. 1226, vol. 2.

Parviz, Babak A., "Augmented Reality in a Contact Lens," IEEE Spectrum, Sep. 2009, http://spectrum.ieee.org/biomedical/bionics/augmented-reality-in-a-contact-lens/0.

Lingley et al., "A Single-Pixel Wireless Contact Lens Display," J. Micromech. Microeng., Nov. 22, 2011, 21 (2011) 125014 (8pp); doi:10.1088/0960-1317/21/12/125014; Received Jun. 9, 2011, in final form Sep. 19, 2011.

Lumus—Consumer Market Products; Retrieved from http://www.lumus-optical.com/index.php?option=com_content&task=view&id=9&Itemid=15; Retrieved Dec. 30, 2011.

Azuma et al., "Improving Static and Dynamic Registration in an Optical See-Through HMD," Proc. of ACM SIGGRAPH 1994, Computer Graphics, Annual Conference Series, Orlando, FL, Jul. 24-29, 1994, pp. 197-204.

Cakmakci et al., "Meshfree Approximation Methods for Free-Form Surface Representation in Optical Design With Applications to Head-Worn Displays," Proc. of SPIE, 2008, vol. 7061, 70610D-1, http://www.creol.ucf.edu/Research/Publications/2012.pdf.

Hastings, A., "Eye Box Performance Parameters for Non Pupil Forming. Head/Helmet Mounted Displays," Tutorial, OPT 521, Dec. 6, 2006, www.optics.arizona.edu/optomech/.../tutorials/HastingsTutorial1.doc.

Hopkins et al., "Simple Thin Lens Optical Systems," US Department of Defense, Military Standardization Handbook: Optical Design, MIL-HDBK-141, Oct. 5, 1962, FSC-6650, Section 7, http://www.optics.arizona.edu/opti510I/ references/mil-hdbk-141/ch7_12.pdf.

Klepper, Sebastian, "Augmented Reality—Display Systems," Technische Universitaet Muenchen, Munich, Germany, 2007, http://campar.in.tum.de/twiki/pub/Chair/TeachingSs07ArProseminar/1_Display-Systems_Klepper_Report.pdf.

Melzer et al. "Guidelines for HMD Design," in Helmet-Mounted Displays: Sensation, Perception and Cognition Issues, C. E. Rash et al., ed., U.S. Army Aeromedical Research Laboratory, Fort Rucker,

(56) References Cited

OTHER PUBLICATIONS

AL, 2009, Chapter 17, http://www.usaarl.army.mil/publications/hmd_book09/files/Section%2026%20-%20Chapter17%20Guidelines%20for%20HMD%20design.pdf.
Melzer, James E., "Head-Mounted Displays," The Avionics Handbook, Cary R. Spitzer, ed., CRC Press, Boca Raton FL, 2001, Chapter 5, http://www.davi.ws/avionics/TheAvionicsHandbook_Cap_5.pdf.
Nagahara et al., "Super Wide Viewer Using Catadioptric Optics," Proc. ACM Symposium on Virtual Reality Software and Technology (VRST2003), Oct, 2003, pp. 169-175, Osaka, Japan.
Nagahara et al., "Wide Field of View Catadioptrical Head-Mounted Display," Proc. of 2003 IEEE/RSJ, Intl. Conference on Intelligent Robots and Systems, Las Vegas NV, Oct. 2003, 3738-3743.
Livingston et al., "An Augmented Reality System for Military Operations in Urban Terrain," Proc of I/ITSEC '02, Orlando FL, Dec. 2-5, 2002.
Vanden Brook, T., "Device Helps Pinpoint Snipers: Technology Is Critical for U.S. Combat Troops," USA Today, Wednesday, Mar. 2, 2011.
Schwald et al., An Augmented Reality System for Training and Assistance to Maintenance in the Industrial Context, Journal of WSCG, Feb. 3-7, 2003, vol. 11, No. 1, Plzen, Czech Republic.
Rolland et al., "Development of Head-Mounted Projection Displays for Distributed, Collaborative, Augmented Reality Applications," Oct. 2005, Presence, vol. 14, No. 5, pp. 528-549.
Kato et al., "Marker Tracking and HMD Calibration for a Video-based Augmented Reality Conferencing System," 1999.
Kato et al., "Virtual Object Manipulation on a Table-Top AR Environment," 2000.
Billinghurst et al., "Collaboration with Tangible Augmented Reality Interfaces," 2002.
Liu et al., "An Optical See-Through Head Mounted Display with Addressable Focal Planes," IEEE Int'l Symposium on Mixed and Augmented Reality Sep. 15-18, 2008, Cambridge, UK.
Bayer et al., "Introduction to Helmet-Mounted Displays," 2009, U.S. Army Medical Dept., Medical Research and Material Command.
Rolland et al., "Invited Paper: Head-Worn Displays—Lens Design," 48th Annual SID Symposium, Seminar, and Exhibition 2010, Display Week 2010, May 23, 2010-May 28, 2010, vol. 2, pp. 855-858, Society for Information Display.
Spitzer et al., "Video I/O Interface for Wearable Computers," Proceedings of the SPIE—The International Society for Optical Engineering, vol. 3689, pp. 278-283, 1999, Conference: Helmet- and Head-Mounted Displays IV, Apr. 5-6, 1999, Orlando, FL, SPIE—Int. Soc. Opt. Eng, USA.
Upton et al., "Eyeglass Head-Up Display [Vibrating Fiber Optic Assembly," 1981 SID International Symposium. Digest of Papers, Apr. 28-30, 1981, vol. XII, pp. 48-49, New York, NY, SID, Los Angeles, CA.
Rose, Melinda, "Microdisplays: Coming Soon to an Eye Near You?" Photonics Spectra, Sep. 2008, vol. 42, No. 9, pp. 68-69, Laurin Publishing Co. Inc.
Kurze et al., "Smart Glasses: An Open Environment for AR Apps," 2010 9th IEEE International Symposium on Mixed and Augmented Reality (ISMAR). Science & Technology Papers, Oct. 13-16, 2010, 313, 2010, Seoul, South Korea.
Schonlau et al., "Personal Viewer: A Wide-Field Low-Profile See-Through Eyewear Display," Proceedings of the SPIE—The International Society for Optical Engineering, Apr. 14-16, 2004, vol. 5443, No. 1, pp. 277-287, Orlando, FL, SPIE—Int. Soc. Opt. Eng.
Mukawa et al., "A Full Color Eyewear Display Using Holographic Planar Waveguides," IDW '08—Proceedings of the 15th International Display Workshops, Dec. 3, 2008-Dec. 5, 2008, vol. 1, pp. 259-262, Inst. of Image Information and Television Engineers.
Mukawa et al., "A Full-Color Eyewear Display Using Planar Waveguides with Reflection Volume Holograms," Journal of the Society for Information Display, vol. 17, No. 3, pp. 185-193, Mar. 2009, Society for Information Display.
Dejong, C. Dean, "Full-Color, See-Through, Daylight-Readable, Goggle-Mounted Display," Proceedings of SPIE—The International Society for Optical Engineering, Apr. 28, 2011-Apr. 28, 2011, vol. 8041, SPIE.
von Waldkirch et al., "Spectacle-Based Design of Wearable See-Through Display for Accommodation-Free Viewing," Pervasive Computing. Second International Conference, Pervasive 2004. Proceedings. (Lecture Notes in Comput. Sci. vol. 3001), Apr. 18-23, 2004, 106-23, Springer-Verlag, Berlin, Germany.
Ayras et al., "Near-To-Eye Display Based on Retinal Scanning and a Diffractive Exitpupil Expander," Proceedings of SPIE—The International Society for Optical Engineering, Apr. 12, 2010-Apr. 15, 2010, vol. 7723, No. 77230V, SPIE.
Ferscha et al., "Wearable Displays for Everyone!" IEEE Pervasive Computing, Jan.-Mar. 2010, vol. 9, No. 1, pp. 7-10, Institute of Electrical and Electronics Engineers Inc.
"SEOS Ultra Wide Field-of-View Head Mounted Display," http://cgsd.com/SEOSHMD/, Jan. 3, 2003.
Amery, John G., et al., "Flight Simulation Visual Requirements and a New Display System," Cockpit Displays VI: Displays for Defense Applications, Proceedings of the SPIE, vol. 3690, Aug. 16, 1999, 16 pages.
Author Unknown, "ABI Research Anticipates 'Dramatic Growth' for Augmented Reality via Smartphones," Human-Machine Technology Research Service, ABI Research, Oct. 22, 2009, 1 page.
Holden, Windsor, "A New Reality for Mobile," Whitepaper, Juniper Research Limited, Feb. 2011, 5 pages.
Author Unknown, "Immersive Displays: Powerwall, CAVE, Headmounted Displays (HMD)," InterSense Applications, Downloaded at http://www.intersense.com/categories/11/, Accessed on Mar. 7, 2011, InterSense Incorporated, 3 pages.
Feiner, Steven, et al., "MARS—Mobile Augmented Reality Systems," Columbia University, Computer Graphics and User Interfaces Lab, Downloaded at http://graphics.cs.columbia.edu/projects/mars/, Accessed on Mar. 7, 2011, 4 pages.
Haun, Bzur, "Gartner: Mobility market will reach $1 trillion by 2014," Mobility Management News and Blogs, Visage Mobile, Oct. 21, 2010, 2 pages.
Henderson, Steve, et al., "Augmented Reality for Maintenance and Repair (ARMAR)," Columbia University, Computer Graphics and User Interfaces Lab, Downloaded at http://graphics.cs.columbia.edu/projects/armar/, Jul. 2007, 4 pages.
Perey, Christine, et al., "Where's the Money? Mobile AR Revenue Streams," Mobile AR Summit Position Paper, Downloaded at http://www.perey.com/MobileARSummit/PEREY-Mobile%20AR-Revenue-Streams.pdf, Feb. 9, 2010, 4 pages.
International Search Report for PCT/IB2011/055824 mailed May 16, 2012, 4 pages.
Written Opinion of the International Searching Authority for PCT/IB2011/055824 mailed May 2, 2013, 5 pages.
International Preliminary Report on Patentability for PCT/IB2011/055824 mailed May 2, 2013, 7 pages.
International Search Report for PCT/IB2011/055820 mailed May 21, 2012, 4 pages.
International Search Report and Written Opinion for PCT/US2011/065201 mailed Mar. 7, 2012, 14 pages.
International Preliminary Report on Patentability for PCT/US2011/065201 mailed Jun. 27, 2013, 11 pages.
International Preliminary Report on Patentability for PCT/IB2011/055826 mailed May 2, 2013, 11 pages.
Non-final Office Action for U.S. Appl. No. 13/211,372 mailed Nov. 21, 2012, 9 pages.
Non-final Office Action for U.S. Appl. No. 13/211,372 mailed Mar. 7, 2013, 12 pages.
Final Office Action for U.S. Appl. No. 13/211,372 mailed Aug. 1, 2013, 7 pages.
Notice of Allowance for U.S. Appl. No. 13/211,372 mailed Sep. 6, 2013, 8 pages.
Non-final Office Action for U.S. Appl. No. 13/211,389 mailed Feb. 26, 2013, 21 pages.
Final Office Action for U.S. Appl. No. 13/211,389 mailed Jul. 12, 2013, 25 pages.

(56) References Cited

OTHER PUBLICATIONS

Notice of Allowance and Applicant-Initiated Interview Summary for U.S. Appl. No. 13/211,389 mailed Sep. 19, 2013, 10 pages.
Non-final Office Action for U.S. Appl. No. 13/327,217 mailed Jan. 17, 2014, 14 pages.
Notice of Allowance for U.S. Appl. No. 13/211,389 mailed Jan. 6, 2014, 8 pages.
Final Office Action for U.S. Appl. No. 13/327,217 mailed Jul. 31, 2014, 13 pages.
Advisory Action for U.S. Appl. No. 13/327,217 mailed Nov. 5, 2014, 3 pages.
Examination Report for Australian Patent Application No. 2011319480 issued Oct. 27, 2014, 3 pages.
Examination Report for Australian Patent Application No. 2011319481 issued Oct. 23, 2014, 3 pages.
McClernon, Chris et al., "PC-Based Desktop Display versus Immersive Head-Mounted Display Flight Simulator Performance," Interservice/Industry Training, Simulation, and Education Conference (I/ITSEC), Dec. 2006, http:// www.iitsecdocs.com, 7 pages.
Yavrucuk, I., et al., "A low Cost Flight Simulator Using Virtual Reality Tools," IEEE Aerospace and Electronics Systems Magazine, vol. 26, Issue 4, Apr. 2011, IEEE, pp. 10-14.
Examination Report for Australian Patent Application No. 2011343660 issued Oct. 31, 2014, 3 pages.
First Office Action for Chinese Patent Application No. 201180060659.0, issued Nov. 3, 2014, 10 pages.
First Office Action for Chinese Patent Application No. 201180060662.2, issued Nov. 2, 2014, 13 pages.
Office Action for Mexican Patent Application No. MX/a/2013/006722, mailed Dec. 8, 2014, 7 pages.
First Office Action for Chinese Patent Application No. 201180067287.4, issued Feb. 4, 2015, 11 pages.
Second Office Action for Chinese Patent Application No. 201180060659.0, issued Jun. 30, 2015, 6 pages.
Second Office Action for Chinese Patent Application No. 201180060662.2, issued Jun. 10, 2015, 7 pages.
Non-Final Office Action for U.S. Appl. No. 13/327,217, mailed May 21, 2015, 12 pages.
Notification of Reason(s) for Rejection for Japanese Patent Application No. JP 2013-534454, mailed Sep. 17, 2015, 7 pages.
Second Office Action for Chinese Patent Application No. 201180067287.4, issued Oct. 10, 2015, 9 pages.
Notification of Reason(s) for Rejection for Japanese Patent Application No. JP 2013-544784, mailed Aug. 17, 2015, 9 pages.
Patent Examination Report No. 2 for Australian Patent Application No. 2011343660, issued Oct. 22, 2015, 3 pages.
Final Office Action for U.S. Appl. No. 13/327,217, mailed Oct. 8, 2015, 15 pages.

Unknown, "Optical head-mounted display," Wikipedia, last modified Feb. 25, 2016, en.wikipedia.org/wiki/Optical_head-mounted_display, 18 pages.
Hua, Hong, "Past and future of wearable augmented reality displays and their applications," SPIE Proceedings, vol. 9186, Oct. 20, 2014, SPIE, pp. 91860O-1 to 91860O-12.
Olwal, Alex, et al., "ASTOR: An Autostereoscopic Optical See-through Augmented Reality System," Proceedings of the Fourth IEEE and ACM International Symposium on Mixed and Augmented Reality, Oct. 5-8, 2005, Vienna, Austria, IEEE, pp. 24-27.
Rolland, Jannick, P., "Wide-angle, off-axis, see-through head-mounted display," Optical Engineering, vol. 39, Issue 7, Jul. 1, 2000, Society of Photo-Optical Instrumentation Engineers, pp. 1760-1767.
Notice of Allowance and Search Report for Taiwanese Patent Application No. 100148681, mailed Mar. 14, 2016, 12 pages.
International Search Report and Written Opinion for PCT/US2015/055918, mailed Jan. 27, 2016, 9 pages.
Notification of Reason(s) for Rejection for Japanese Patent Application No. 2013-534453, mailed Dec. 22, 2015, 9 pages.
Third Office Action for Chinese Patent Application No. 201180060659.0, mailed Dec. 15, 2015, 6 pages.
Office Action and Search Report for Taiwanese Patent Application No. 100148694, mailed Dec. 1, 2015, 18 pages.
Examination Report for European Patent Application No. 11815631.4, mailed Apr. 13, 2016, 11 pages.
Third Office Action for Chinese Patent Application No. 201180067287.4, mailed Apr. 12, 2016, 10 pages.
Patent Examination Report No. 1 for Australian Patent Application No. 2015249168, issued Jun. 27, 2016, 3 pages.
Notification of Reasons for Rejection for Japanese Patent Application No. 2013-534454, mailed Jun. 1, 2016, 13 pages.
Notification of Reasons for Rejection for Japanese Patent Application No. 2013-544784, mailed May 31, 2016, 11 pages.
International Search Report and Written Opinion for International Patent Application No. PCT/US2016/020444, mailed Jun. 14, 2016, 11 pages.
Non-Final Office Action for U.S. Appl. No. 14/501,509, mailed Jul. 15, 2016, 7 pages.
Non-Final Office Action for U.S. Appl. No. 13/327,217, mailed Jun. 2, 2016, 18 pages.
Second Office Action for Mexican Patent Application No. MX/a/2013/004453, mailed Jan. 19, 2017, 6 pages.
Examination Report for European Patent Application No. 11806088.8, mailed Dec. 7, 2016, 5 pages.
International Search Report for International Patent Application No. PCT/US2016/057731, mailed Dec. 19, 2016, 12 pages.
Final Office Action for U.S. Appl. No. 14/884,975, mailed Feb. 8, 2017, 36 pages.

* cited by examiner

HEAD-MOUNTED DISPLAY APPARATUS EMPLOYING ONE OR MORE FRESNEL LENSES

CROSS-REFERENCE TO RELATED APPLICATIONS

This application claims priority under 35 U.S.C. 119(e) to U.S. Provisional Application No. 61/405,440 (entitled HEAD-MOUNTED DISPLAY, filed Oct. 21, 2010), U.S. Provisional Application No. 61/417,325 (entitled CURVED-STACKED FRESNEL ARCHITECTURE, filed Nov. 26, 2010), U.S. Provisional Application No. 61/417,326 (entitled CURVED-BEAM SPLITTER ARCHITECTURE, filed Nov. 26, 2010), U.S. Provisional Application No. 61/417,327 (entitled COMBINED ARCHITECTURE OF FRESNEL LENSE AND FLAT BEAM SPLITTER, filed Nov. 26, 2010), U.S. Provisional Application No. 61/417,328 (entitled COMBINED ARCHITECTURE OF FRESNEL LENSE AND CURVED BEAM SPLITTER, filed Nov. 26, 2010), and U.S. Provisional Application No. 61/427,530 (entitled CURVED MIRROR FOR HEAD MOUNTED DISPLAY, filed Dec. 28, 2010), which are incorporated herein in their entireties by reference.

FIELD

This disclosure relates to head-mounted display apparatus employing one or more Fresnel lenses. In certain embodiments, the apparatus also employs one or more reflective optical surfaces, e.g., one or more free space, ultra-wide angle, reflective optical surfaces (hereinafter abbreviated as "FS/UWA/RO surfaces"). In certain embodiments, the overall optical system is a non-pupil forming system, i.e., the controlling aperture (aperture stop) of the entire system is the pupil of the user's eye.

The one or more Fresnel lenses and, when used, the one or more reflective surfaces (e.g., the one or more FS/UWA/RO surfaces) are employed to display imagery from a light-emitting display system held in close proximity to a user's eye.

BACKGROUND

A head-mounted display such as a helmet-mounted display or eyeglass-mounted display (abbreviated herein as a "HMD") is a display device worn on the head of an individual that has one or more small display devices located near one eye or, more commonly, both eyes of the user.

Some HMDs display only simulated (computer-generated) images, as opposed to real-world images, and accordingly are often referred to as "virtual reality" or immersive HMDs. Other HMDs superimpose (combine) a simulated image upon a non-simulated, real-world image. The combination of non-simulated and simulated images allows the HMD user to view the world through, for example, a visor or eyepiece on which additional data relevant to the task to be performed is superimposed onto the forward field of view (FOV) of the user. This superposition is sometimes referred to as "augmented reality" or "mixed reality."

Combining a non-simulated, real-world view with a simulated image can be achieved using a partially-reflective/partially-transmissive optical surface (a "beam splitter") where the surface's reflectivity is used to display the simulated image as a virtual image (in the optical sense) and the surface's transmissivity is used to allow the user to view the real world directly (referred to as an "optical see-through system"). Combining a real-world view with a simulated image can also be done electronically by accepting video of a real world view from a camera and mixing it electronically with a simulated image using a combiner (referred to as a "video see-through system"). The combined image can then be presented to the user as a virtual image (in the optical sense) by means of a reflective optical surface, which in this case need not have transmissive properties.

From the foregoing, it can be seen that reflective optical surfaces can be used in HMDs which provide the user with: (i) a combination of a simulated image and a non-simulated, real world image, (ii) a combination of a simulated image and a video image of the real world, or (iii) purely simulated images. (The last case is often referred to as an "immersive" system.) In each of these cases, the reflective optical surface produces a virtual image (in the optical sense) that is viewed by the user. Historically, such reflective optical surfaces have been part of optical systems whose exit pupils have substantially limited not only the dynamic field of view available to the user, but also the static field of view. Specifically, to see the image produced by the optical system, the user needed to align his/her eye with the optical system's exit pupil and keep it so aligned, and even then, the image visible to the user would not cover the user's entire full static field of view, i.e., the prior optical systems used in HMDs that have employed reflective optical surfaces have been part of pupil-forming systems and thus have been exit-pupil-limited.

The reason the systems have been so limited is the fundamental fact that the human field of view is remarkably large. Thus, the static field of view of a human eye, including both the eye's foveal and peripheral vision, is on the order of ~150° in the horizontal direction and on the order of ~130° in the vertical direction. (For the purposes of this disclosure, 150 degrees will be used as the straight ahead static field of view of a nominal human eye.) Well-corrected optical systems having exit pupils capable of accommodating such a large static field of view are few and far between, and when they exist, they are expensive and bulky.

Moreover, the operational field of view of the human eye (dynamic field of view) is even larger since the eye can rotate about its center of rotation, i.e., the human brain can aim the human eye's foveal+peripheral field of view in different directions by changing the eye's direction of gaze. For a nominal eye, the vertical range of motion is on the order of ~40° up and ~60° down and the horizontal range of motion is on the order of ±~50° from straight ahead. For an exit pupil of the size produced by the types of optical systems previously used in HMDs, even a small rotation of the eye would substantially reduce what overlap there was between the eye's static field of view and the exit pupil and larger rotations would make the image disappear completely. Although theoretically possible, an exit pupil that would move in synchrony with the user's eye is impractical and would be prohibitively expensive.

In view of these properties of the human eye, there are three fields of view which are relevant in terms of providing an optical system which allows a user to view an image generated by an image display system in the same manner as he/she would view the natural world. The smallest of the three fields of view is that defined by the user's ability to rotate his/her eye and thus scan his/her fovea over the outside world. The maximum rotation is on the order of ±50° from straight ahead, so this field of view (the foveal dynamic field of view) is approximately 100°. The middle of the three fields of view is the straight ahead static field of view and includes both the user's foveal and peripheral vision. As discussed above, this field of view (the foveal+peripheral static field of view) is on the order of 150°. The largest of the three fields of view is that defined by the user's ability to rotate his/her eye and thus scan his/her foveal plus his/her peripheral vision over the outside world. Based on a maximum rotation on the order of ±50° and a foveal+peripheral static field of view on the order of 150°, this largest field of view (the foveal+peripheral dynamic field of view) is on the order of 200°. This increasing scale of fields of view from at least 100 degrees to at least 150 degrees and then to at least 200 degrees provides corresponding benefits to the user in terms of his/her ability to view images generated by an image display system in an intuitive and natural manner.

In order for the human eye to focus easily on a display that is within 10 inches of the eye, a form of collimation needs to be applied to the light rays emanating from the display. The collimation serves to make the light rays appear as if they originate from a distance greater than the actual distance between the eye and the display. The greater apparent distance, in turn, allows the eye to readily focus on an image of the display. Some head-mounted displays use multiple mirrors or prisms in an attempt to collimate light from the display. The use of multiple mirrors or prisms adds bulk and weight, making such head-mounted displays more cumbersome and heavier than desired.

There thus exists a need for head-mounted displays that are compatible with the focusing ability as well as with at least the foveal dynamic field of view of the human eye. The present disclosure is directed to these needs and provides head-mounted displays that produce collimated (or substantially collimated) light over a wide field of view.

DEFINITIONS

In the remainder of this disclosure and in the claims, the phrase "virtual image" is used in its optical sense, i.e., a virtual image is an image that is perceived to be coming from a particular place where in fact the light being perceived does not originate at that place.

Throughout this disclosure, the following phrases/terms shall have the following meanings/scope:
  (1) The phrase "a reflective optical surface" (also referred to herein as a "reflective surface") shall include surfaces that are only reflective as well as surfaces that are both reflective and transmissive. In either case, the reflectivity can be only partial, i.e., part of the incident light can be transmitted through the surface. Likewise, when the surface is both reflective and transmissive, the reflectivity and/or the transmissivity can be partial. As discussed below, a single reflective optical surface can be used for both eyes or each eye can have its own individual reflective optical surface. Other variations include using multiple reflective optical surfaces for either both eyes or individually for each eye. Mix and match combinations can also be used, e.g., a single reflective optical surface can be used for one eye and multiple reflective optical surfaces for the other eye. As a further alternative, one or multiple reflective optical surfaces can be provided for only one of the user's eyes. The claims set forth below are intended to cover these and other applications of the reflective optical surfaces disclosed herein. In particular, each claim that calls for a reflective optical surface is intended to cover head-mounted display apparatus that includes one or more reflective optical surfaces of the type specified.
  (2) The phrase "an image display system having at least one light-emitting surface" is used generally to include any display system having a surface which emits light whether by transmission of light through the surface, generation of light at the surface (e.g., by an array of LEDs), reflection off of the surface of light from another source, or the like. The image display system can employ one or multiple image display devices, e.g., one or multiple LED and/or LCD arrays. As with reflective optical surfaces, a given head-mounted display apparatus can incorporate one or more image display systems for one or both of the user's eyes. Again, each of the claims set forth below that calls for an image display system is intended to cover head-mounted display apparatus that includes one or more image display systems of the type specified.
  (3) The phrase "binocular viewer" means an apparatus that includes at least one separate optical element (e.g., one display device and/or one reflective optical surface) for each eye.
  (4) The phrase "field of view" and its abbreviation FOV refer to the "apparent" field of view in image (eye) space as opposed to the "real" field of view in object (i.e., display) space.

SUMMARY

In accordance with an aspect, a head-mounted display apparatus comprises a frame adapted to be mounted on a user's head, an image display system supported by the frame, a reflective optical surface supported by the frame, the reflective optical surface being a continuous surface that is not rotationally symmetric about any coordinate axis of a three-dimensional Cartesian coordinate system, and a Fresnel lens system supported by the frame, the Fresnel lens system being located between the image display system and the reflective optical surface. The image display system includes at least one light-emitting surface. The reflective optical surface is configured to reflect spatially-separated virtual images of spatially-separated portions of the at least one light-emitting surface, at least one of the spatially-separated virtual images being angularly separated from at least one other of the spatially-separated virtual images by at least 100 degrees, the angular separation being measured from the center of rotation of a nominal user's eye. At least one point of the reflective optical surface is angularly separated from at least one other point of the reflective optical surface by at least 100 degrees, the angular separation being measured from the center of rotation of the nominal user's eye.

In accordance with another aspect, a head-mounted display apparatus comprises a frame adapted to be mounted on a user's head, an image display system supported by the frame and comprising at least one light-emitting surface, a free-space, ultra-wide angle, reflective optical surface supported by the frame, and a Fresnel lens system supported by the frame, the Fresnel lens system being located between the image display system and the free-space, ultra-wide angle, reflective optical surface. The free-space, ultra-wide angle, reflective optical surface and the Fresnel lens system produce spatially-separated virtual images of spatially-separated portions of the at least one light-emitting surface, at least one of the spatially-separated virtual images being angularly separated from at least one other of the spatially-separated virtual images by at least 100 degrees, the angular separation being measured from a center of rotation of a nominal user's eye.

In accordance with another aspect, a head-mounted display apparatus comprises a frame adapted to be mounted on a user's head, an image display system supported by the frame, a reflective surface supported by the frame, and a Fresnel lens system supported by the frame, the Fresnel lens system being located between the image display system and the reflective optical surface. The Fresnel lens system comprises at least one Fresnel lens element that is curved.

In accordance with another aspect, a head-mounted display apparatus comprises a frame adapted to be mounted on a user's head, an image display system supported by the frame, and a Fresnel lens system supported by the frame. The Fresnel lens system is located between the image display system and a nominal user's eye. The Fresnel lens system comprises at least one Fresnel lens element having a plurality of facets that are separated from another by edges wherein at least some of the edges lie along radial lines that (i) pass through a center of rotation of the nominal user's eye, or (ii) pass through the center of a nominal user's natural lens, or (iii) are normal to a surface of a nominal user's cornea.

DETAILED DESCRIPTION

Figure 1:
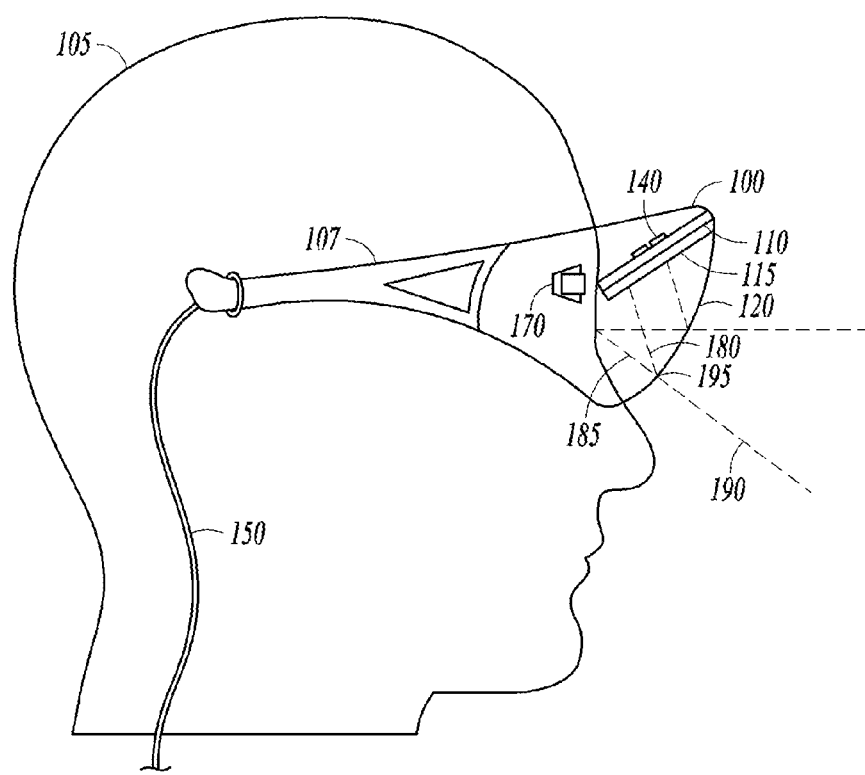
FIG. 1 is a side view representation of a head-mounted display apparatus according to an example embodiment.

Reference will be made below in detail to embodiments, which are illustrated in the accompanying drawings. Wherever possible, the same reference numerals used throughout the drawings refer to the same or like parts. The accompanying drawings are included to provide a further understanding of the invention, and are incorporated in and constitute a part of this specification. It is to be understood that the various features of the embodiments disclosed in this specification and in the drawings can be used in any and all combinations.

I. Introduction

As discussed above, the present disclosure relates to HMDs which provide a user with a collimated (or substantially collimated) image through the use of a Fresnel lens system, which may be a curved Fresnel lens system (see below). The Fresnel lens system may be the sole source of collimation in the optical system or, in embodiments that employ curved reflective optical surface, e.g., a FS/UWA/RO surface, the Fresnel lens system's collimation may be combined with collimation contributed by the curved reflective optical surface.

The following discussion begins with a description of embodiments that employ a FS/UWA/RO surface (Section II) and then proceeds to a discussion of Fresnel lens systems for use with those embodiments as well as other embodiments disclosed herein (Section III). Section III also includes a discussion of the design process for a FS/UWA/RO surface that is used in an optical system that includes a Fresnel lens system. Following Section (III), embodiments that employ a reflective optical surface that is not a FS/UWA/RO surface and a curved Fresnel lens systems are discussed (Section IV), followed by embodiments in which an image display system is viewed directly through a curved Fresnel lens system without the use of a reflective surface (Section V). Finally, a general discussion applicable to the various embodiments disclosed herein is presented (Section VI).

It should be understood that the discussions of the various components of HMDs that appear in particular sections of the presentation are not limited to the embodiments of that section, but are generally applicable to all of the embodiments disclosed herein. As one example, the description of the types of image display systems that may be used in a HMD is applicable to the Section I embodiments (where the description appears), as well as to the Sections IV and V embodiments.

II. HMDs That Employ FS/UWA/RO Surfaces

Figure 2:
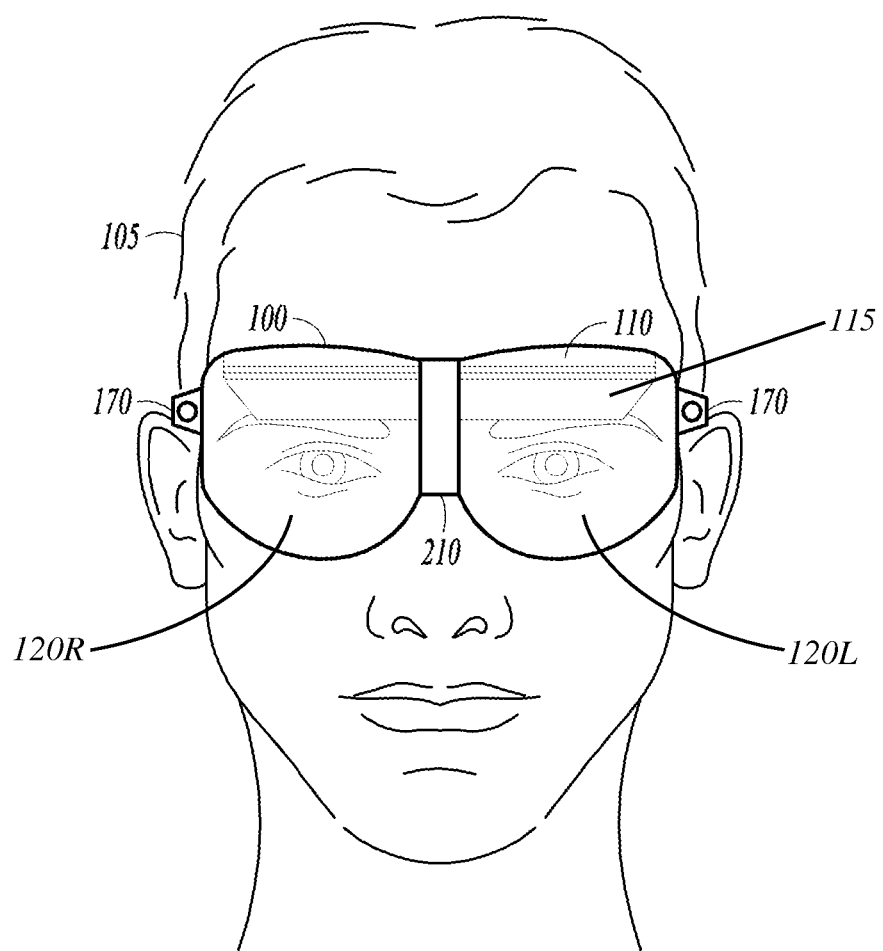
FIG. 2 is a front view representation of the head-mounted display apparatus of FIG. 1.

FIGS. 1 and 2 are, respectively, a side view and a front view of a head-mounted display apparatus 100 shown being worn by a user 105. The head-mounted display apparatus employs a FS/UWA/RO surface 120.

In one embodiment, the head-mounted display apparatus 100 can be, for example, an optical see-through, augmented reality, binocular viewer. Because an optical see-through, augmented reality, binocular viewer is typically the most complex form of a HMD, the present disclosure will primarily discuss embodiments of this type, it being understood that the principles discussed herein are equally applicable to optical see-through, augmented reality, monocular viewers, video see-through, augmented reality, binocular and monocular viewers, and binocular and monocular "virtual reality" systems.

As shown in FIGS. 1 and 2, the head-mounted display apparatus 100 includes a frame 107 adapted to be worn by the user and supported by the user's nose and ears in a manner similar to that in which eyeglasses are worn. In the embodiment of FIGS. 1-2, as well as in the other embodiments disclosed herein, the head-mounted display apparatus may have a variety of configurations and can, for example, resemble conventional goggles, glasses, helmets, and the like. In some embodiments, a strap may be used to hold the HMD's frame in a fixed position with respect to the eyes of the user. In general terms, the outside surface of the HMD package can assume any form that holds the optical system in the required orientation with respect to the HMD's display(s) and the user's eyes.

The head-mounted display apparatus 100 includes at least one image display system 110 and, as shown in FIGS. 1 and 2, a free space, ultra-wide angle, reflective optical surface 120, i.e., a FS/UWA/RO surface 120, which by necessity is curved. Surface 120 can be purely reflective or can have both reflective and transmissive properties, in which case, it can be thought of as a type of "beam splitter." As further disclosed herein, the reflective optical surface 120 may not be rotationally symmetric (is not a surface of revolution) about axes of a three-dimensional Cartesian coordinate system (x, y, or z), thus having an arbitrary origin.

Surface 120 is referred to herein as a "free space" surface because its local spatial positions, local surface curvatures, and local surface orientations are not tied to a particular substrate, such as the x-y plane, but rather, during the surface's design, are determined using fundamental optical principles (e.g., the Fermat and Hero least time principle) applied in three dimensional space. Surface 120 is referred to as an "ultra-wide angle" surface because, during use, at a minimum, it does not limit the dynamic foveal field of view of a nominal user's eye. As such, depending on the optical properties of the Fresnel lens system with which the FS/UWA/RO surface is used, the overall optical system of the HMD can be non-pupil forming, i.e., unlike conventional optical systems that have an exit pupil which limits the user's field of view, the operative pupil for various embodiments of the optical systems disclosed herein will be the entrance pupil of the user's eye as opposed to one associated with the external optical system. Concomitantly, for these embodiments, the field of view provided to the user will be much greater than conventional optical systems where even a small misalignment of the user's eye with the exit pupil of the external optical system can substantially reduce the information content available to the user and a larger misalignment can cause the entire image to disappear.

Figure 5:
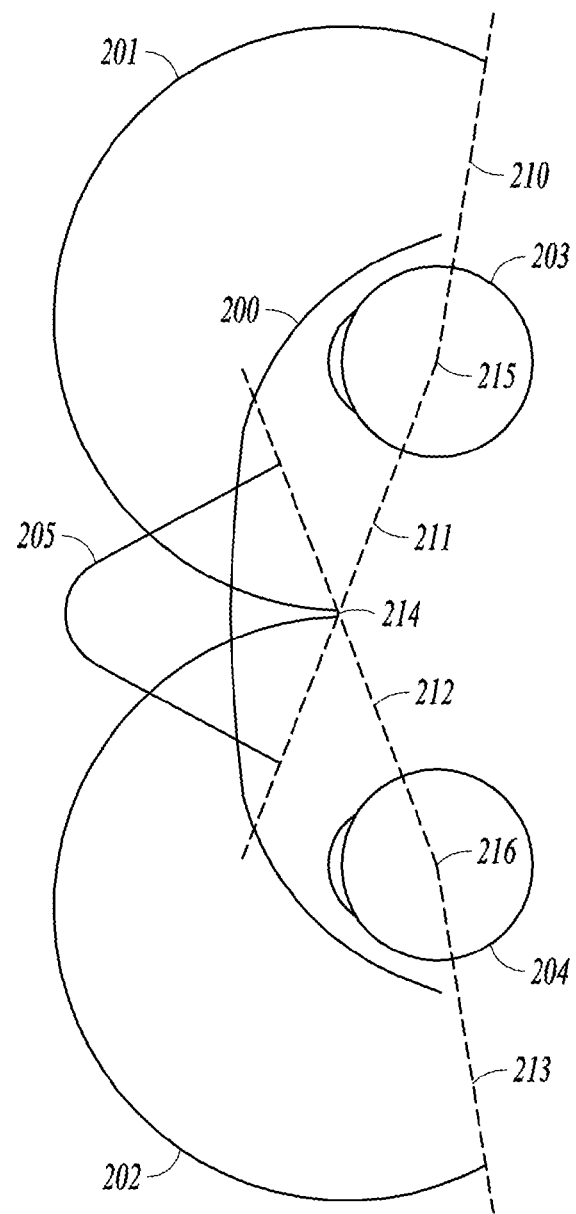
FIG. 5 is a top view of a head-mounted display apparatus illustrating the use of two curved reflective optical surfaces corresponding to the two eyes of a user according to an example embodiment.

FS/UWA/RO surface 120 may completely surround one or both eyes, as well as the at least one image display system 110. In particular, the surface can curve around the sides of the eyes and toward the sides of the face so as to expand the available horizontal field of view. In one embodiment, the FS/UWA/RO surface 120 may extend up to 180° or more (e.g., more than)200°), as best seen in FIG. 5 discussed below. As illustrated in FIG. 2, the HMD may include two separate FS/UWA/RO surfaces 120R and 120L for the user's two eyes which are separately supported by the frame and/or a nasal ridge piece 210 (see below). Alternately, the HMD may employ a single FS/UWA/RO surface that serves both eyes with a single structure, some portions of which are viewed by both eyes and other portions of which are viewed by only one eye.

As noted immediately above and as illustrated in FIG. 2, the head-mounted display apparatus 100 can include a nasal ridge piece 210. The nasal ridge piece can be a vertical bar or wall which provides a separation between two FS/UWA/RO surfaces, one for each of the user's eye. The nasal ridge piece 210 can also provide a separation between the fields of view of the user's two eyes. In this way, the user's right eye can be shown a first representation of three dimensional physical reality in the environment by displaying a first image to the right eye via a first image display device and a first FS/UWA/RO surface, while the user's left eye is shown a second representation of three dimensional physical reality in the environment by displaying a second image to the left eye via a second image display device and a second FS/UWA/RO surface. A separate display device/reflective surface combination thus services each eye of the user, with each eye seeing the correct image for its location relative to the three dimensional physical reality in the environment. By separating the user's two eyes, the ridge piece 210 allows the image applied to each eye to be optimized independently of the other eye. In one embodiment, the nasal ridge piece's vertical wall may include two reflectors, one on each side, to allow the user to see imagery as he/she turns his/her eyes nasally, either to the left or to the right.

The at least one image display system 110 can be mounted inside the FS/UWA/RO surface 120 and may be horizontally disposed or at a slight angle with respect to the horizon. Alternatively, the at least one image display system can be located just outside of the FS/UWA/RO surface. The tilt or angle of the at least one image display system 110 or, more particularly, its at least one light-emitting surface, will in general be a function of the location of the pixels, images, and/or pieces of display information that are to be reflected from the surface 120.

In certain embodiments, the head-mounded display apparatus 100 is configured to create an interior cavity, with the FS/UWA/RO surface being reflective inward into the cavity. For a FS/UWA/RO surface having transmissive properties, the image or display information from the at least one image display system is reflected into the cavity and to the user's eye from the surface while, simultaneously, light also enters the cavity and the user's eye from the external world by passing through the reflective surface.

The head-mounted display apparatus can include an electronics package 140 to control the images that are displayed by the at least one image display system 110. In one embodiment, the electronics package 140 includes accelerometers and gyroscopes that provide location, orientation and position information needed to synchronize images from the at least one image display system 110 with user activities. Power and video to and from the head-mounted display apparatus 100 can be provided through a transmission cable 150 coupled to the electronics package 140 or through a wireless medium.

A set of cameras 170 may be situated on opposite sides of the head-mounted display apparatus 100 to provide input to the electronics package to help control the computer generation of, for example, "augmented reality" scenes. The set of cameras 170 may be coupled to the electronics package 140 to receive power and control signals and to provide video input to the electronics package's software.

The image display system used in the head-mounted display apparatus can take many forms, now known or subsequently developed. For example, the system can employ small high resolution liquid crystal displays (LCDs), light emitting diode (LED) displays, and/or organic light emitting diode (OLED) displays, including flexible OLED screens. In particular, the image display system can employ a high-definition small-form-factor display device with high pixel density, examples of which may be found in the cell phone industry. A fiber-optic bundle can also be used in the image display system. In various embodiments, the image display system can be thought of as functioning as a small screen television. If the image display system produces polarized light (e.g., in the case where the image display system employs a liquid crystal display where all colors are linearly polarized in the same direction), and if the FS/UWA/RO surface is polarized orthogonally to the light emitted by the display, then light will not leak out of the FS/UWA/RO surface. The information displayed and the light source itself will accordingly not be visible outside of the HMD.

Overall operation of an exemplary embodiment of an optical system constructed in accordance with the present disclosure, specifically, an optical system for an "augmented reality" HMD, is illustrated by the ray-tracings of FIG. 1, specifically, light rays 180, 185, and 190. In this embodiment, FS/UWA/RO surface 120 has both reflective and transmissive properties. Using surface 120's transmissive properties, light ray 190 enters from the environment through the surface and proceeds towards the user's eye. From the same region of surface 120, light ray 180 is reflected by the surface (using the surface's reflective properties) and joins light ray 190 to create combined light ray 185 that enters the user's eye when the user looks in the direction of point 195, i.e., when the user's direction of gaze is in the direction of point 195. While so looking, the user's peripheral vision capabilities allow the user to see light from other points in the environment which pass through surface 120, again using the surface's transmissive properties.

III. Fresnel Lens Systems

In accordance with the present disclosure, the images and/or pieces of display information provided by the at least one image display system are adjusted for near viewing prior to entering the user's eye(s). For example, in the exemplary embodiment of FIGS. 1 and 2, the adjustment is performed by lens system 115 which includes one or more Fresnel lens elements and serves to modify the diopter characteristics of the light beam emanating from the display surface thus making it easier for the user to focus on the virtual image of the display produced by the overall optical system. FIGS. 12-14 and 15-18 show other embodiments employing Fresnel lens elements to modify the diopter characteristics of light emanating from a display. In addition to this function, the Fresnel lens elements also serve to magnify the image provided to the user. In some embodiments, a magnification of between three to six or more may be obtained with multiple Fresnel lens elements arranged in a stacked configuration.

As discussed in more detail below, in certain embodiments, the Fresnel lens system contains one or more curved Fresnel lens elements, i.e., Fresnel lenses constructed on curved, rather than flat, substrates. For ease of reference, Fresnel lens systems that include a curved Fresnel lens element will be referred to herein as "curved Fresnel lens systems," it being understood that not all of the Fresnel lens elements used in a curved Fresnel lens system need be curved. The phrase "Fresnel lens system" will be used to describe the general case of a lens system that includes at least one Fresnel lens element (whether curved or flat) which performs the function of modifying the diopter characteristics of the light beam emanating from an image display system to facilitate near-to-the-eye viewing of an image of the display. As discussed in more detail below, in embodiments that employ a FS/UWA/RO surface, if desired, the FS/UWA/RO surface can also have optical properties that contribute to in-focus, near-to-the-eye viewing of images formed on the at least one light-emitting surface of the image display system.

In general terms, the Fresnel lens systems disclosed herein can comprise various combinations of flat and/or curved Fresnel lenses selected to adjust the diopter of the light emanating from the image display system so as to allow the eye to be able to focus on the display and, in the case of "augmented reality" HMDs, also focus on objects in the external environment. The presence of at least one curved Fresnel lens in a curved Fresnel lens system provides at least one additional parameter (i.e., the curvature of the lens) for controlling aberrations in the image provided to the user. For example, one or more Fresnel lenses having curved configurations can provide substantial reductions in chromatic aberrations. Furthermore, Fresnel surfaces manufactured on curved substrates can provide reduced off-axis aberrations.

More generally, the optical properties of the Fresnel lens system and the one or more Fresnel lenses included therein can be selected empirically or through analytic ray-tracing. Ray-tracing can, for example, allow optimization of the apparatus parameters for a particular implementation, such as military training, flight simulation, gaming and other commercial applications. The parameters that are available for optimization include, for example, the curvature of the display, the dimensions of the display, the curvature of the Fresnel lenses, aspheric parameters in cases where the Fresnel lens system or other parts of the optical system include one or more aspheric surfaces, and the Fresnel lens power versus the distances from (i) the front of the display screen and (ii) the user's eye.

In some embodiments, the Fresnel lens elements produce no field curvature, so a wide field of view can be provided using a small number of thin optical components. In other embodiments, the Fresnel lens system can include one or more aspheric surfaces to aid in the correction of image aberrations. The aspheric surface can be applied on either surface of any of the optical components of the Fresnel lens system. Nominally, the first and second surfaces of the Fresnel lens elements will have the same base radius of curvature (i.e., their thickness will be constant over their clear aperture). Additional aberration correction or functionality may be achievable by allowing one or more of the Fresnel lens elements to have different radii on their first and second surfaces.

In various embodiments, through the use of Fresnel lens elements, including aspheric Fresnel lens elements, an optical system can be realized as a compact and lightweight system, having a large viewable field of view, an image quality commensurate with typical human visual resolution, and an overall structure that can be manufactured in large quantities at low cost. If desired, the Fresnel lens system can include one or more diffractive surfaces (diffractive components) to reduce chromatic aberrations, particularly lateral chromatic aberration. For example, lens elements 810, 1330, and 1135 may include one or more diffractive surfaces. In this way, a corrected image of an image display device, including a flat image display device, can be achieved either using the Fresnel lens system alone or in combination with a FS/UWA/RO surface. In certain embodiments, the one or more Fresnel lenses will provide most of the optical power in the system and will be designed to minimize monochromatic aberrations.

The Fresnel lens elements, which in one embodiment are assembled with a gap between adjacent lenses, may be made much thinner than typical lenses, so the space and weight of the optical system is significantly reduced compared to conventional thick lenses. The weight may be further reduced by making all lenses from plastic. However, glass could also be used. The plastic lenses can be produced by either diamond machining or molding.

Figure 3:
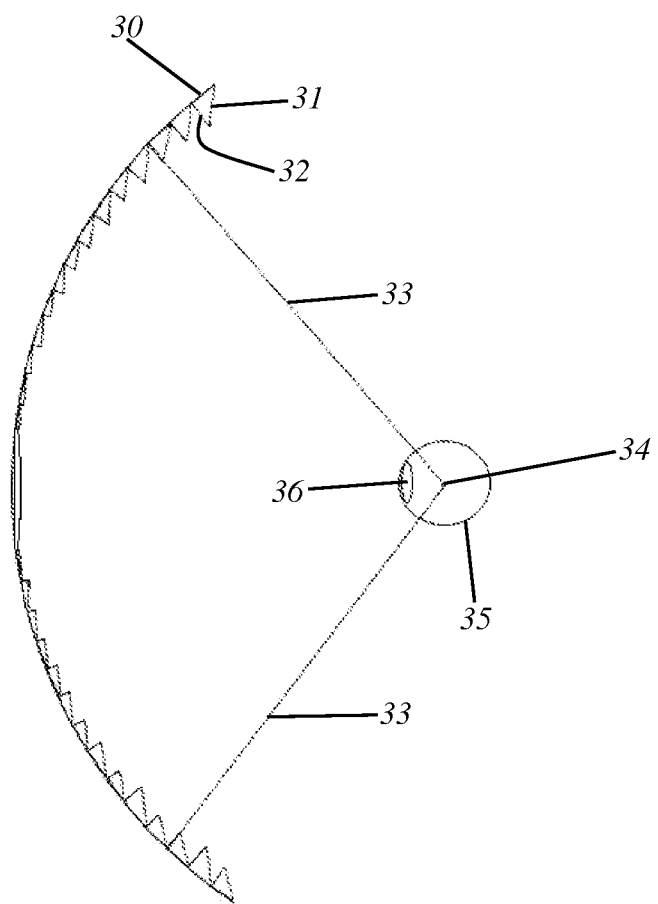
FIG. 3 is a schematic cross-sectional view of a Fresnel lens element having facets whose edges pass through the center of rotation of a user's eye according to an example embodiment.

In certain embodiments, one or more (or all) of the curved Fresnel lens elements can have facets whose edges lie along radial lines that pass through the center of rotation of a nominal user's eye. FIG. 3 illustrates such an embodiment where 30 is the Fresnel lens, 31 is a facet of the Fresnel lens, 32 is an edge of a facet of the Fresnel lens, and 33 is a radial line which passes through the center of rotation 34 of a nominal user's eye 35. FIG. 3 also shows the internal lens 36 (natural lens 36) of the nominal user's eye. Alternatively, one or more (or all) of the curved Fresnel lens elements can have facets whose edges lie along radial lines that pass through the center of a nominal user's natural lens or are normal to the surface of a nominal user's cornea.

As noted above, Fresnel lenses are particularly well-suited for use in HMDs because of their light weight. The lenses can, however, create image aberrations due to the angle of incidence of the light waves leaving the display on the lens surface. In particular, the light waves can pass through unintended sections of the Fresnel lens grooves. In accordance with the embodiment illustrated in FIG. 3, such aberrations can be reduced by providing the Fresnel lens with a domed shape, specifically, a spherical shape, centered on the center of rotation of a nominal user's eye, such that the edges of the Fresnel facets are normal to the surface of the dome everywhere around the lens' surface. Alternatively, the domed shape (spherical shape) can be centered on the center of a nominal user's natural lens or can be concentric with a nominal user's cornea. In these ways, light beams pass through the lens parallel to the edges of the facets and optical aberrations due to these discontinuities are avoided, improving, among other things, the color response of the lens. It should be noted that convergent facet edges will reduce optical distortion in a viewed image even if all of the edges do not exactly satisfy one of the above conditions, e.g., if all of the edges do not exactly pass through the center of rotation of a nominal user's eye. Accordingly, rather than having a pure spherical shape, the Fresnel lens can be substantially spherical (e.g., the Fresnel lens can have an aspheric surface) and can still benefit from having at least some convergent facet edges.

Although Fresnel lens elements having square, rectangular, or other clear aperture shapes can be used if desired, in general, the Fresnel lenses will have circular clear apertures. In most applications, the size of the smallest clear aperture of the lenses making up the Fresnel lens system will determine whether or not the overall optical system is a pupil forming or a non-pupil forming system. In particular, for an overall optical system composed of a Fresnel lens system and a FS/UWA/RO surface, the exit pupil of the system will typically be the image of the smallest clear aperture of the Fresnel lens system produced by the optical elements downstream of that aperture (i.e., towards the user's eye). That is, the system's overall aperture stop will typically be in the Fresnel lens system because in terms of apertures, FS/UWA/RO surfaces behave as if they have very large clear apertures. Depending on the size and location of the image of the smallest clear aperture of the Fresnel lens system produced by the FS/UWA/RO surface (as well as by any elements of the Fresnel lens system on the downstream side of the element with the smallest clear aperture), the overall system may provide the user with a full foveal dynamic field of view, a full foveal+peripheral static field of view, or a full foveal+peripheral dynamic field of view.

Figure 4:
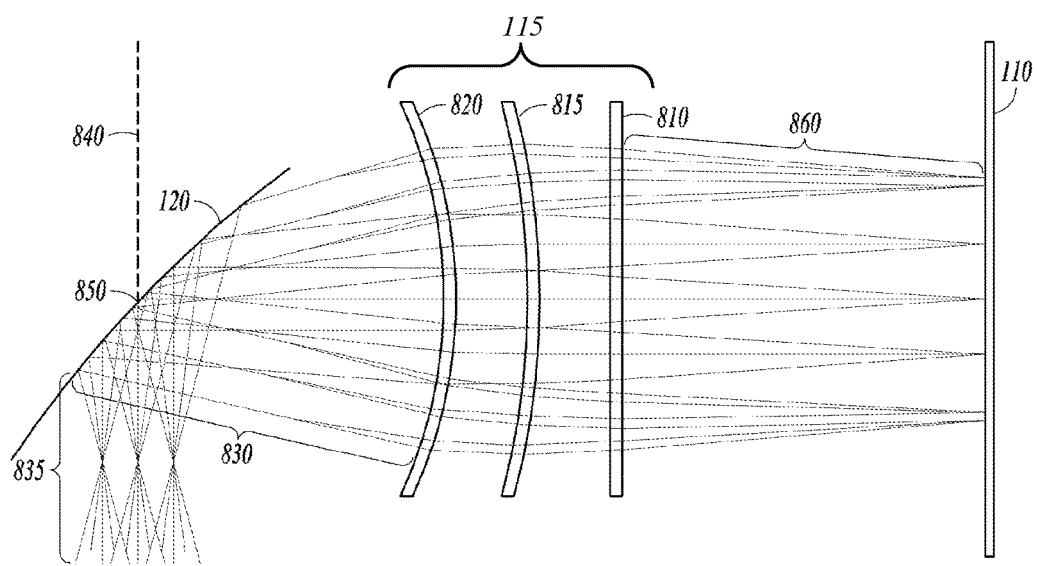
FIG. 4 illustrates an optical system for a head-mounted display apparatus that includes a Fresnel lens system and a curved reflective optical surface according to an example embodiment.

FIG. 4 shows an embodiment of a HMD optical system which employs a FS/UWA/RO surface and a Fresnel lens system 115 having a flat Fresnel lens 810 and two curved Fresnel lenses 815 and 820, which, as shown in FIG. 4, are adjacent to one another. Light rays 830, 835, and 840 are shown in this figure with light 840 entering from the environment and becoming combined with light 830 to create combined light 835 that enters the user's eye when the user looks in the direction of point 850. The user's peripheral vision capabilities also allow the user to see light from points other than point 850.

More particularly, a diverging wavefront of light 860 emanating from the at least one image display system 110 is converged in a positive-diopter Fresnel lens system having Fresnel lenses 810, 815, and 820 to provide light 830 that is between zero diopter and the initial diopter. The initial diopter of the light emanating from the at least one image display system 110 can, for example, be approximately $D=1/(0.03[m])=33$ dpt. After leaving the Fresnel lens system, the light reflects from FS/UWA/RO surface 120 where, if desired, additional diopter divergence can be removed using the surface curvature techniques discussed below.

The total diopter change can, for example, be 33 dpt, and this may be split between the FS/UWA/RO surface and the Fresnel lenses in various embodiments. In particular, the amount of diopter change supplied by the FS/UWA/RO surface can be reduced which in various embodiments may be advantageous in designing and manufacturing the FS/UWA/RO surface. Because diopters are additive, however much vergence is supplied by one of the optical components does not have to be supplied by the other. (This additive property of diopter values can be used in combining the collimating effects of the Fresnel lens system and the FS/UWA/RO surface, as well as in combining the effects of the individual lens elements making up the Fresnel lens system. It can also be used to take account of the collimating effects of any other optical components that may be part of the overall system.) In the exemplary embodiment of FIG. 4, a diopter change of 33 dpt will result in a final beam that is collimated (0 dpt) or substantially collimated (~0 dpt). This is equivalent to light coming from a point essentially infinitely distant, and the light wavefront will be flat, resulting in parallel surface normals to the wavefront, shown as rays 835, across the entrance to the eye. Collimated reflected light can, for example, be desirable when the external world includes items that are effectively at infinity relative to the user. As noted above, the FS/UWA/RO surface 120 admits light ray 840 from the external environment, thus allowing the internal images to overlay the external images and, in particular, external images which are effectively at infinity relative to the user's eye.

As discussed above, prior optical systems used in HMDs that have employed reflective optical surfaces have been pupil forming and thus have had limited viewing areas, a typical field of view being ~60 degrees or less. This has greatly limited the value and capability of prior headmounted display apparatuses. In various embodiments, the head-mounted displays disclosed herein have much wider fields of view (FOV), thus allowing much more optical information to be provided to the user compared to HMDs having smaller fields of view. The wide field of view can be greater than 100°, greater than 150°, or greater than 200°. In addition to providing more information, the wide field of view allows the additional information may be processed by the user in a more natural manner, enabling better immersive and augmented reality experiences through a better match of the displayed images to physical reality.

Specifically, in the exemplary embodiment illustrated in FIG. 5, for a straight ahead direction of gaze, the eye is able to take in a whole viewing area represented in FIG. 5 by curved FS/UWA/RO surfaces 201 and 202, corresponding to at least 150 degrees of horizontal field of view (FOV) for each eye (e.g., ~168 degrees of horizontal FOV). This field of view is composed of the eye's foveal field of view and its peripheral field of view. In addition, the eye is allowed to move freely about its center of rotation to aim the combined foveal+peripheral field of view in different directions of gaze, as the eye naturally does when viewing the physical world. The optical systems disclosed herein thus allow the eye to obtain information throughout a range of motion in the same manner as the eye does when viewing the natural world.

Examining FIG. 5 in more detail, this figure is a simplified line representation of the front of a user's head 200 as seen from the top. It shows FS/UWA/RO surfaces 201 and 202 placed in front of the user's eyes 203 and 204. As discussed above, the FS/UWA/RO surfaces 201 and 202 may rest upon the user's nose 205 where they come together at the center front 214 of the user's head 200. As discussed in detail below, the local normals and local spatial locations of surfaces 201 and 202 are adjusted so that images produced by the at least one image display system (not shown in FIG. 5) cover at least 100°, e.g., in certain embodiments, at least 150° and, in other embodiments, at least 200°, of horizontal FOV for each eye. (Optionally, as also discussed below, the local radii of curvature are also adjusted to provide, when combined with a Fresnel lens system, distant virtual images.) For example, the local normals and local spatial locations can be adjusted to cover the user's complete ~168 degree, straight ahead, horizontal, static field of view for each eye, with the 168 degrees extending from edge-to-edge of the FS/UWA/RO surfaces 201 or 202, as shown by sight lines 210,211 and 212,213. The sight lines thus correspond to the wide static field of view (foveal+peripheral) that is provided to the user. In addition, the user is free to move his/her eyes around rolling centers 215 and 216 while continuing to see computer-generated imagery.

Figure 10:
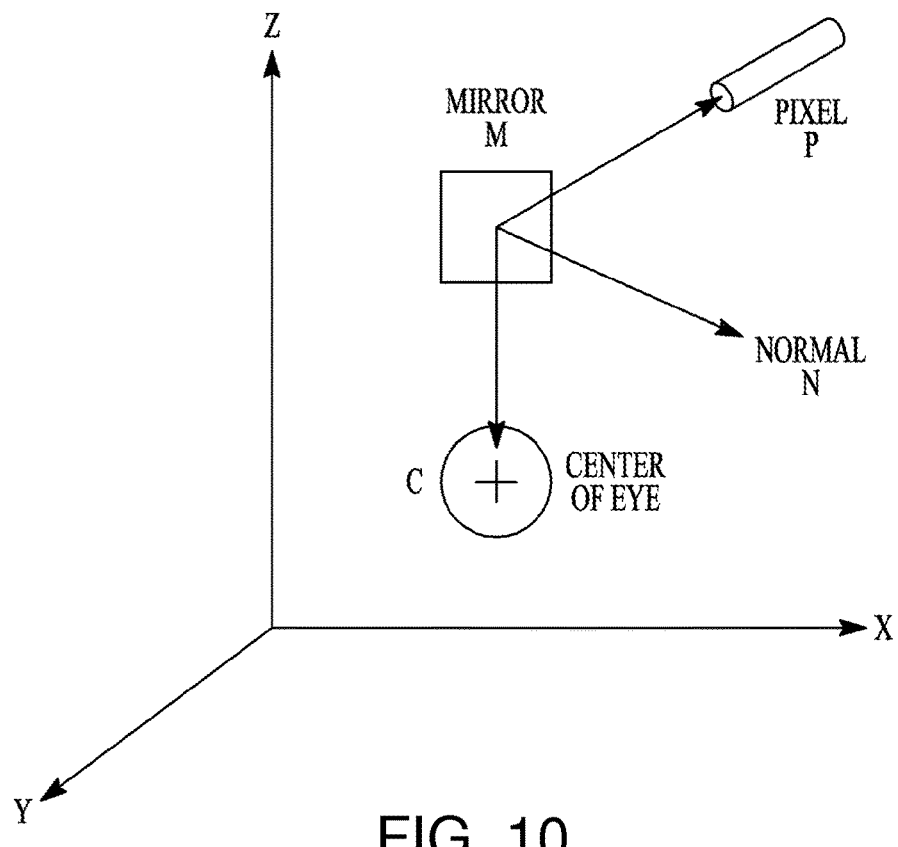
FIG. 10 is a diagram illustrating variables used in selecting the direction of the local normal of a reflector according to an example embodiment.
Figure 11:
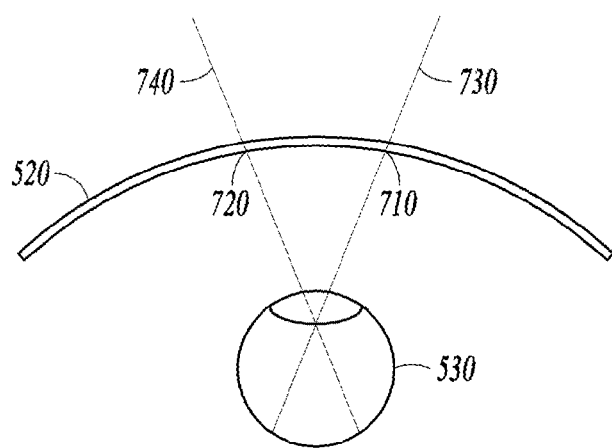
FIG. 11 is a representation of a curved reflector along with light paths according to an example embodiment.

In FIG. 5, as well as in FIG. 11, the FS/UWA/RO surfaces are shown as parts of spheres for ease of presentation. In practice, the surfaces are not spheres, but have more complex configurations so that their local normals and local spatial locations (and, optionally, local radii of curvature) will provide the desired static and dynamic fields of view (and, optionally, desired distances to the virtual images). Also, in FIG. 5, the right side of the head-mounted display apparatus operates identically to left side, it being understood that the two sides can differ if desired for particular applications. Also for ease of presentation, FIGS. 5-11 do not show an optical system which includes at least one Fresnel lens between the at least one image display system and the reflective optical surface, it being understood that in accordance with the present disclosure, such an optical system is used in the embodiments disclosed herein.

Figure 6:
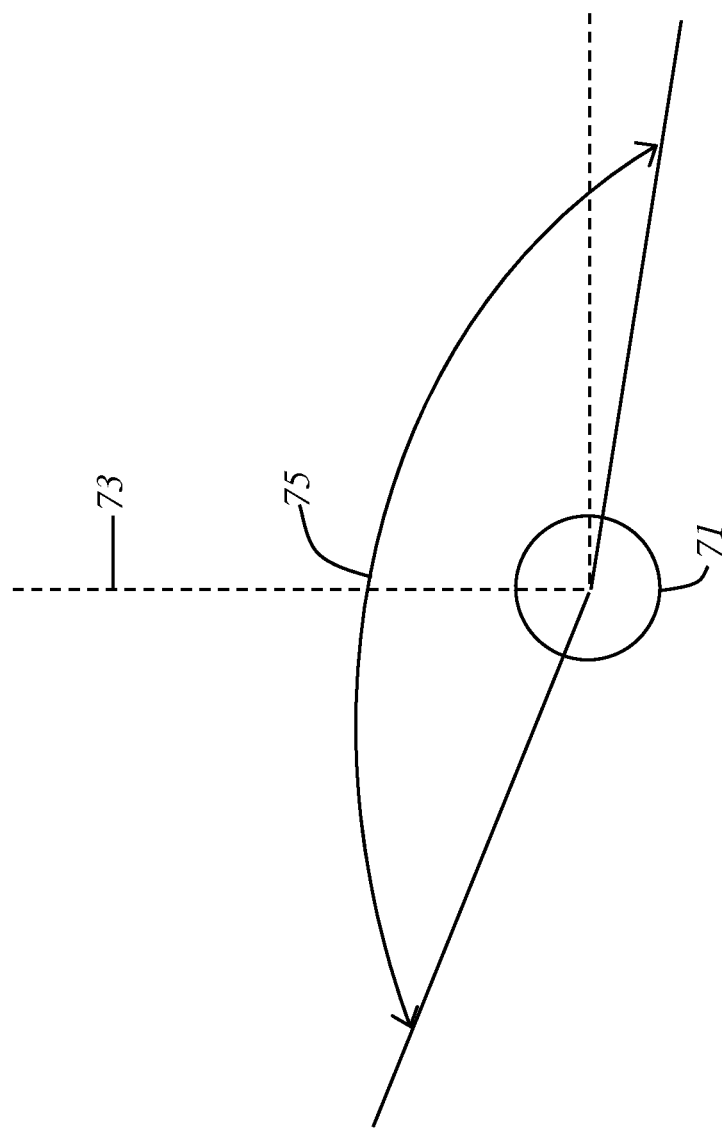
FIG. 6 is a schematic diagram illustrating a static field of view of a nominal human eye for a straight ahead direction of gaze.
Figure 7:
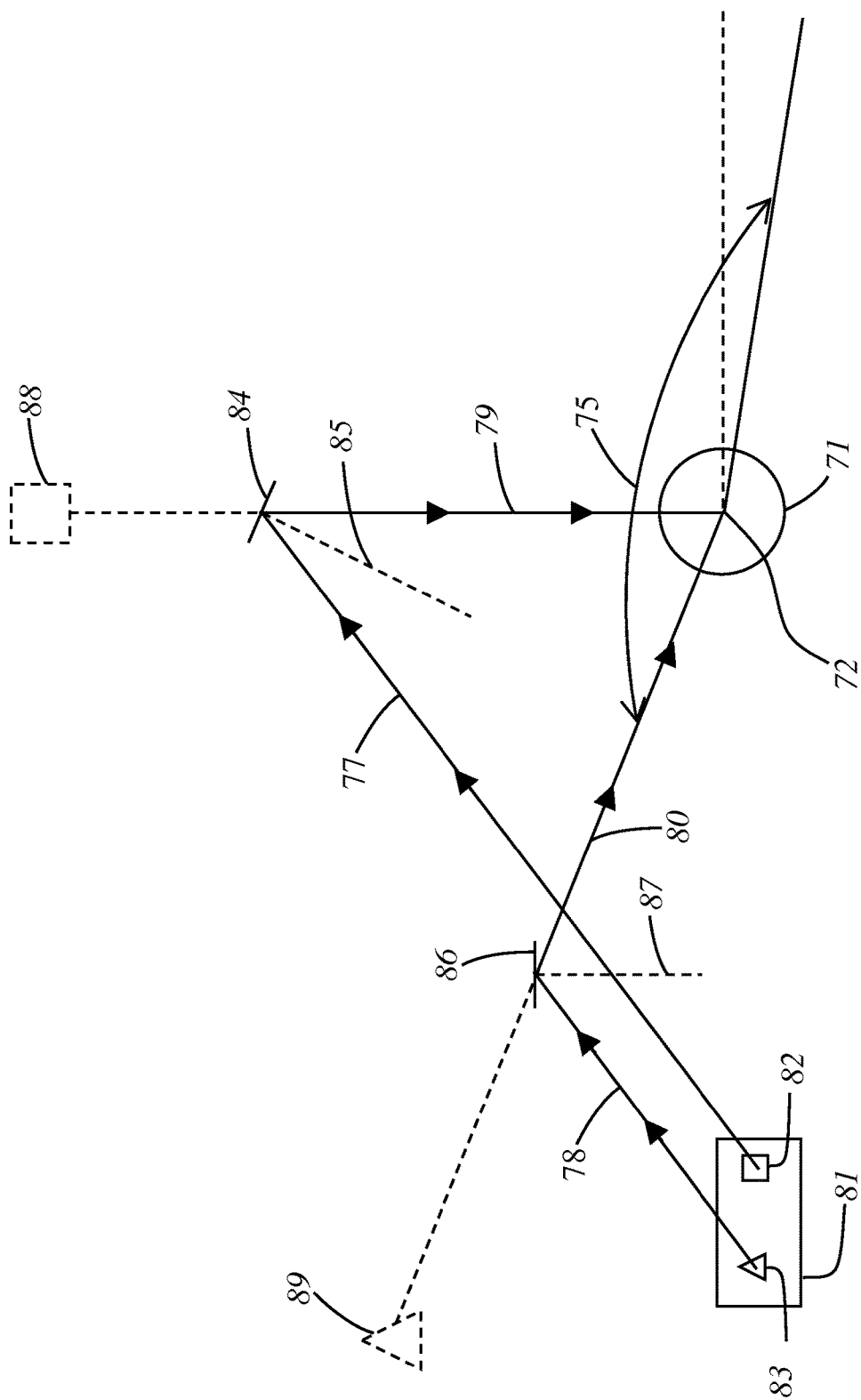
FIG. 7 is a schematic diagram illustrating the interaction between the static field of view of FIG. 6 with a FS/UWA/RO surface according to an example embodiment. The arrows in FIG. 7 illustrate directions of light propagation.

FIGS. 6 and 7 further illustrate the static and dynamic fields of view provided by the FS/UWA/RO surfaces disclosed herein. FIG. 6 shows a user's nominal right eye 71 having a straight ahead direction of gaze 73. The eye's foveal+peripheral field of view is shown by arc 75, which has an angular extent of ~168°. Note that for ease of presentation, in FIGS. 6-8, the field of view is shown relative to the center of rotation of the user's eye as opposed to the center or edges of the user's pupil. In fact, the large field of view (e.g., ~168°) achieved by a human eye is a result of the large angular extent of the retina which allows highly oblique rays to enter the user's pupil and reach the retina.

FIG. 7 schematically shows the interaction of the field of view of FIG. 6 with a HMD having: (a) an image display system whose at least one light-emitting surface 81 has a first light-emitting region 82 (illustrated as a square) and a second light-emitting region 83 (illustrated as a triangle) and (b) a FS/UWA/RO surface having a first reflective region 84 which has a first local normal 85 and a second reflective region 86 which has a second local normal 87.

As indicated above, the FS/UWA/RO surface is both a "free space" surface and an "ultra-wide angle" surface. In addition, as noted above and discussed in more detail below, the surface can participate in collimation (or partial collimation) of the light that enters the user's eye. Such collimation causes the virtual image produced by the FS/UWA/RO surface and the Fresnel lens system to appear to be located a long distance from the user, e.g., 30 meters or more, which permits the user to easily focus on the virtual image with a relaxed eye.

The "free space" and "ultra-wide angle" aspects of the FS/UWA/RO surface can be achieved by adjusting the local normals of the surface so that the user's eye sees light-emitting regions of the at least one image display system as coming from predetermined regions of the FS/UWA/RO surface (predetermined locations on the surface).

For example, in FIG. 7, the designer of the HMD might decide that it would be advantageous for a virtual image 88 of the square to be viewed by the center portion of the user's retina when the user's direction of gaze is straight ahead and for a virtual image 89 of the triangle to be viewed by the center portion of the user's retina when the direction of gaze is, for example, ~50° to the left of straight ahead. The designer would then configure the at least one image display system, the FS/UWA/RO surface, the Fresnel lens system and any other optical components of the system so that the virtual image of the square would be straight ahead and the virtual image of the triangle would be 50° to the left of straight ahead during use of the HMD.

In this way, when the user's direction of gaze (line of sight) intersected the FS/UWA/RO surface straight on, the virtual image of the square would be visible at the center of the user's eye as desired, and when the user's direction of gaze (line of sight) intersected the FS/UWA/RO surface at 50 degrees to the left of straight ahead, the virtual image of the triangle would be visible at the center of the user's eye, as also desired. Although not illustrated in FIGS. 6 and 7, the same approaches are used for the vertical field of view, as well as for off-axis fields of view. More generally, in designing the HMD and each of its optical components, the designer "maps" the at least one light-emitting surface of the display to the reflective surface so that desired portions of the display are visible to the user's eye when the eye's gaze is in particular directions. Thus, as the eye scans across the field of view, both horizontally and vertically, the FS/UWA/RO surface shines different portions of the at least one light emitting surface of the image display system into the user's eye. Although the foregoing discussion has been in terms of the center of a nominal user's retina, the design process can, of course, use the location of a nominal user's fovea instead, if desired.

It should be noted that in FIG. 7, any rotation of the user's eye to right causes the virtual image 89 of the triangle to no longer be visible to the user. Thus, in FIG. 7, any direction of gaze that is straight ahead or to the left of straight ahead provides the user with virtual images of both the square and the triangle, while a direction of gaze to the right of straight ahead provides a virtual image of only the square. The acuity of the virtual images will, of course, depend on whether the virtual images are perceived by the user's foveal vision or the user's peripheral vision.

If the designer of the HMD had placed the virtual image of the square far to the right in FIG. 7 while leaving the virtual image of the triangle far to the left, there would be directions of gaze where only the virtual image of the square was visible and other directions of gaze where only the virtual image of the triangle was visible. Likewise, based on the principles disclosed herein, the designer could arrange the virtual image of the square and the virtual image of the triangle so that the virtual image of the triangle was always visible, with the virtual image of the square being visible for some directions of gaze, but not for others. As a further variation, the designer of the HMD could place the virtual image of the square and triangle at locations where for one or more directions of gaze, neither image was visible to the user, e.g., the designer could place the virtual images just outside the user's static field of view for a straight ahead direction of gaze. The flexibility provided to the HMD designer by the present disclosure is thus readily apparent.

In one embodiment, the "free space" and the "ultra-wide angle" aspects of the reflective surface are achieved by using the principles of Fermat and Hero pursuant to which light travels along the shortest (least time) optical path. Commonly-assigned and co-pending U.S. patent application Ser. No. 13/211,389, filed Aug. 17, 2011, in the names of G. Harrison, D. Smith, and G. Wiese, entitled "Methods and Systems for Creating Free Space Reflective Optical Surfaces,", the contents of which are incorporated herein by reference, describes an embodiment in which the Fermat and Hero principles are used to design FS/UWA/RO surfaces suitable for use in HMDs. See also commonly-assigned and co-pending U.S. patent application Ser. No. 13/211,372, filed Aug. 17, 2011, in the names of G. Harrison, D. Smith, and G. Wiese, entitled "Head-Mounted Display Apparatus Employing One or More Reflective Optical Surfaces,", the contents of which are also incorporated herein by reference.

By means of the Fermat and Hero least-time principles, any "desired portion" of the at least one light-emitting surface of an image display system (e.g., any pixel of an image display system) can be caused to have any desired point of reflection at the FS/UWA/RO surface, provided that the optical path from the desired portion of the at least one light-emitting surface to the point of reflection at the FS/UWA/RO surface and then to the center of rotation of the user's eye is at an extremum.

Figure 8:
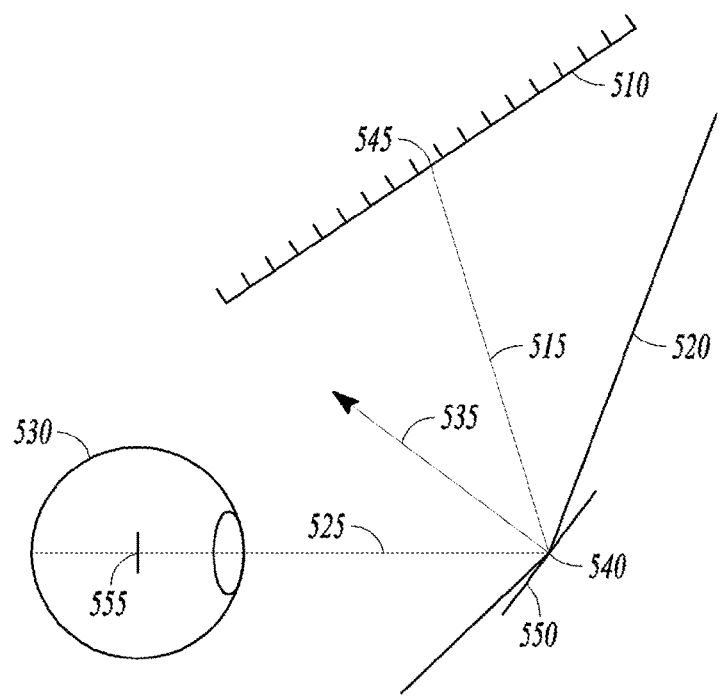
FIG. 8 is a ray diagram illustrating a light path from a given pixel on a display as it is reflected toward an eye according to an example embodiment.
Figure 9:
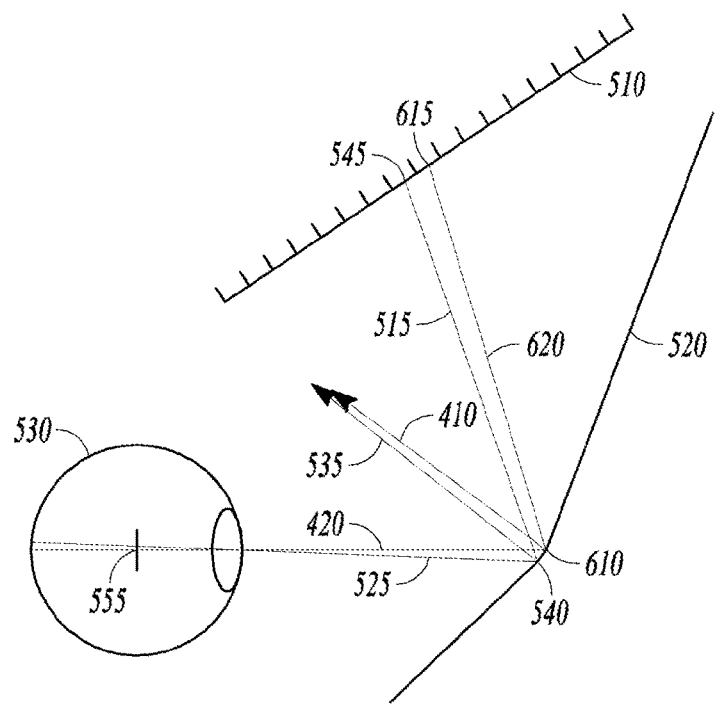
FIG. 9 is a ray diagram illustrating light paths from two pixels on a display as they are reflected toward an eye according to an example embodiment.

An extremum in the optical path means that the first derivative of the optical path length has reached a zero value, signifying a maximum or a minimum in the optical path length. An extremum can be inserted at any point in the field of view by creating a local region of the reflective optical surface whose normal bisects (a) a vector from the local region to the user's eye (e.g., a vector from the center of the local region to the center of the user's eye) and (b) a vector from the local region to the "desired portion" of the light-emitting surface (e.g., a vector from the center of the local region to the center of the "desired portion" of the light-emitting surface). FIGS. 8 and 9 illustrate the process for the case where the "desired portion" of the at least one light-emitting surface of the image display system is a pixel.

Specifically, FIG. 8 shows a light-emitting surface 510 of an image display system composed of a generally rectangular array of pixels that are emanating light toward the front of a head-mounted display apparatus in the direction of light beam 515. Light beam 515 bounces off of reflective optical surface 520, which for ease of presentation is shown as a flat in FIG. 8. Upon reflection, light beam 515 becomes light beam 525 that enters the user's eye 530.

For the purposes of determining the surface normal of the reflector for each pixel, it is only necessary to determine the three-dimensional bisector of vectors corresponding to light beams 515 and 25. In FIG. 8, this bisector vector is shown in two-dimensional form as line 535. Bisecting vector 535 is normal to the reflective optical surface at point of reflection 540, which is the location on surface 520 where pixel 545 of light-emitting surface 510 will be visible to the user of the HMD.

Specifically, in operation, pixel 545 in the display surface 510 emits light beam 515 that bounces off reflective optical surface 520 at an angle established by the surface normal corresponding to bisecting vector 535 and its perpendicular plane 550, yielding by the Fermat and Hero principles, a reflected pixel at point of reflection 540 that is seen by the eye 530 along light beam 525. In order to accurately calculate the surface normal at the point of reflection 540, the beam 525 can pass through approximately the center 555 of the user's eye 530. The results will remain approximately stable even if the user's eye rotates, becoming peripheral vision until, as discussed above in connection with FIGS. 6 and 7, the eye turns so much that that region of the display cannot be seen with either the user's foveal or peripheral vision.

To calculate the position of the surface normal, the use of the method of quaternions may be employed, where
   q1=orientation of beam 515
   q2=orientation of beam 525
and
   q3=the orientation of the desired surface normal 535=
      (q1+q2)/2

The surface normal may also be described in vector notation, as illustrated in FIG. 10. In the following equation and in FIG. 10, point N is one unit away from the point M at the center of the region of interest of the reflective optical surface and is in the direction of the perpendicular normal to the tangent plane of the reflective optical surface at the point M. The tangent plane of the reflective optical surface at point M is controlled to satisfy the relation expressed in the following equation such that in three-dimensional space, the surface normal at the point M bisects the line from the point M to the point P at the center of the pixel of interest and the line from point M to the point C at the rolling center of the user's eye (for reference, point C is approximately 13 mm back from the front of the eye).

The equation describing the point N on the surface normal at point M is:

$$N = \frac{(P-M)+(C-M)}{|(P-M)+(C-M)|} + M$$

where all the points, N, M, P, and C have components [x, y, z] that indicate their position in three-dimensional space in an arbitrary Cartesian coordinate system.

The resulting normal vector N-M has the Euclidean length $$|N-M|=1$$

where the two vertical bars represents the Euclidean length, calculated as follows:

$$|N-M|=\sqrt{(x_N-x_M)^2+(y_N-y_M)^2+(z_N-z_M)^2}.$$

As a numerical example, consider the following M, P, and C values:

$$M=[x_M,y_M,z_M]=[4,8,10]$$

$$P=[2,10,5]$$

$$C=[6,10,5]$$

The point along the normal, N, is calculated as follows:

$$P-M=[(2-4),(10-8),(5-10)]=[-2,2,-5]$$

$$C-M=[(6-4),(10-8),(5-10)]=[2,2,-5]$$

$$(P-M)+(C-M)=[0,4,-10]$$

and $$\begin{aligned}N &= \frac{(P-M)+(C-M)}{|(P-M)+(C-M)|} + M \\ &= \{[-2, 2, -5] + [2, 2, -5]\} / 10.7703296143 + [4, 8, 10] \\ &= [0, 0.3713806764, -0.928476691] + [4, 8, 10] \\ &= [4, 8.3713806764, 9.0715233091]\end{aligned}$$

Figure 19:
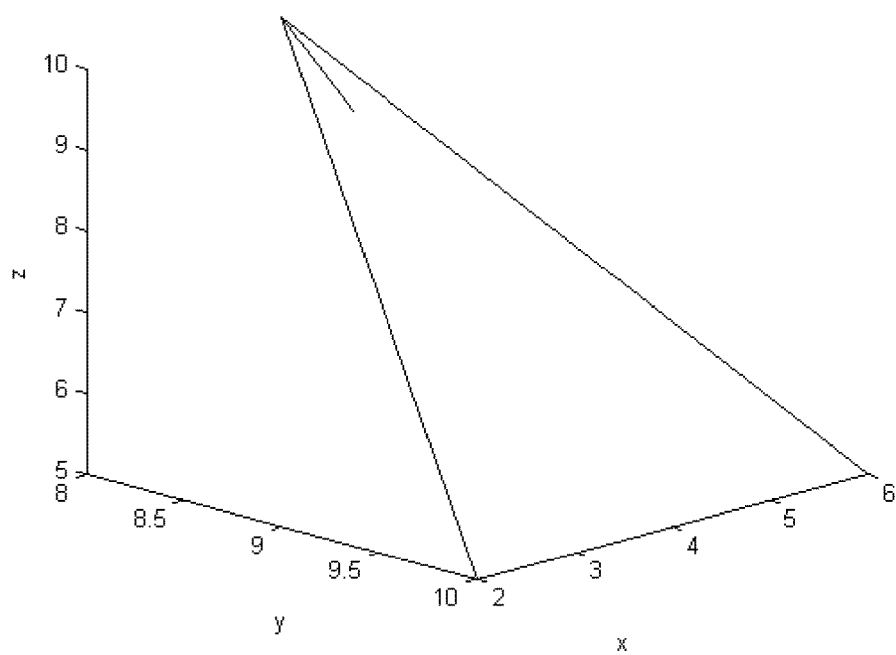
FIG. 19 is a schematic diagram illustrating geometry for calculating a local normal to a reflective surface according to an example embodiment.

The geometry is shown in FIG. 19, where the bisector is between the two longer vectors.

The foregoing is, of course, merely a representative calculation serving to show the use of the Fermat and Hero principles of least time in determining local tangent plane angular constraints for a field of points making up a free-space (free-form) surface manifold of reflecting regions intended to present a contiguous virtual image to the viewer. The only real constant is the center of the user's eye, and the eye's natural field of view. All other components may be iteratively updated until an appropriate solution for a given image display system and reflective optical surface orientation is reached. Looked at another way, the pixel image reflection locations, M1, M2, . . . , Mn, and their associated normals and curvatures may be thought of as a matrix that is "warped" (adjusted) so that the FS/UWA/RO surface achieves the desired virtual image processing of computer-generated images formed by the image display system.

In applying the Fermat and Hero principles, it should be noted that in some embodiments, it will be desirable to avoid the situation where the normals are adjusted such that the user sees the same pixel reflection at more than one point. It should also be noted that in some embodiments, the local regions of the reflective optical surface can be very small and may even correspond to a point on the reflector, with the points morphing into other points to make a smooth surface.

To facilitate the presentation, the effects of the presence of a Fresnel lens system has not been explicitly included in the above discussion of the use of the Fermat and Hero principles to design a FS/UWA/RO surface. In practice, the presence of a Fresnel lens system is readily included in the analysis by using as the input to the Fermat and Hero calculations, the directions of propagation of the light beams after they have passed through the optical elements making up the Fresnel lens system (or any other optical elements used in the overall optical system). Those directions of propagation can, for example, be determined using Gaussian optics techniques. If desired, the Fermat and Hero calculations can be repeated for different initial light vergence settings as controlled by changing the Fresnel lensing power of the Fresnel lens system until desired virtual images are obtained.

In order to ensure that the user can easily focus on the virtual image of the "desired portion" of the at least one light-emitting surface (e.g., the virtual image of a pixel), in certain embodiments, the radius of curvature of the region surrounding the reflection point (reflection area) is controlled so that after passing through the Fresnel lens system and reflecting from the FS/UWA/RO surface, a collimated (or near collimated) image reaches the user. As noted above, a collimated (or near collimated) image has optical rays that are more parallel, as if the image had originated at a far distance from the user, tens to hundreds of meters for instance. In order to achieve such a surface, depending on the collimating power of the Fresnel lens system, the radius of curvature of the reflection region of the reflective optical surface corresponding to the "desired portion" of the at least one light-emitting surface (desired light-emitting pixel) may be kept to a radius on the order of (but greater than) one-half the distance from the reflection region to the actual "desired portion" of the light-emitting surface (actual pixel) on the display. More particularly, the radius will be on the order of one-half the apparent distance from the reflection region to the "desired portion" of the light-emitting surface when the "desired portion" is viewed through the Fresnel lens system from the location of the reflection region.

Thus, in one embodiment, the inter-reflected-pixel normal vector from the pixel of concern to the adjacent pixels satisfies a relationship that allows them to establish a radius of curvature on the order of approximately one-half the length of the vector from the location of the reflected pixel on the reflective surface to the apparent location of the display pixel as seen through the Fresnel lens system. Adjustments that affect this parameter include the size of the at least one light emitting surface and whether the at least one light emitting surface is curved.

FIG. 9 illustrates this embodiment. In order to control the radius of curvature of the region surrounding the pixel reflection so that a collimated (or near collimated) image reaches the user, two adjacent pixel reflecting regions, such as at the point of reflection 540, are considered. More regions may be considered for better balance but two are sufficient. With reference to FIG. 9, two pixel reflective points 540 and 610 are shown with respect to two pixels, 545 and 615, respectively on display surface 510. The surface normals at points 540 and 610 are calculated along with the angle between their directions. The radius of curvature is calculated knowing these angles and the distance between the points 540 and 610. Specifically, the surface configuration and, if needed, the surface's spatial location are adjusted until the radius of curvature is on the order of approximately one-half of the average of the lengths of beams 515 and 620 when those lengths are adjusted for the effects of the Fresnel lens system. In this way, zero or near-zero diopter light can be provided to the user's eye. As noted above, this is equivalent to light coming from a point essentially infinitely distant, and the light wavefront is flat, resulting in parallel surface normals to the light's wavefront.

In addition to controlling the local radii of curvature, in certain embodiments, as a first order point solution to having a collimated (or near collimated) image enter the eye, the at least one light emitting surface is nominally located a distance of one focal length away from the FS/UWA/RO surface, where the focal length is based on the average value of the radii of curvature of the various reflective regions making up the FS/UWA/RO surface.

The result of applying the Fermat and Hero principles is a set of reflective regions that may be combined into a smooth reflective surface. This surface will, in general, not be spherical or symmetric. FIG. 11 is a two dimensional representation of such a FS/UWA/RO surface 520. As discussed above, surface 520 may be constructed such that the radii of curvature at points 710 and 720 are set to values which, when combined with the collimating effects of the Fresnel lens system, provide for relaxed viewing of the image from the at least one light-emitting surface of the image display system which is being reflected by the surface. In this way, looking in a certain direction represented by line 730 will provide a collimated (or near collimated) virtual image to the eye 530, as will looking in a different direction represented by line 740. To enable a smooth transition of viewing all across the field of view, the regions of the FS/UWA/RO surface may be smoothly transitioned from one control point to another, as may be performed by using Non-Uniform Rational B-Spline (NURBS) technology for splined surfaces, thus creating a smooth transition across the reflective surface. In some cases, the FS/UWA/RO surface may include a sufficient number of regions so that the surface becomes smooth at a fine grain level. In some embodiments, different magnifications for each portion of the display (e.g., each pixel) may be provided using a gradual gradient to allow better manufacturability, realization, and image quality.

From the foregoing, it can be seen that the overall head-mounted display can be designed using the following exemplary steps: determining a desired field of view, choosing a display surface size (e.g., width and height dimensions), choosing an orientation for the display surface relative to a reflective surface, choosing a candidate location for the Fresnel lens system between the display and the reflective surface, choosing a candidate configuration for a Fresnel lens system, cataloging the position of every pixel on the display surface as seen through the Fresnel lens system, and choosing a location for display of every pixel from the display surface on the reflective surface. The display surface and the Fresnel lens system can be placed above the eye and tilted toward the reflective surface, allowing the curvature of the reflective surface to reflect light to the eye of the wearer. In further embodiments, the display surface and Fresnel lens system may be placed in other positions, such as to the side of the eye or below the eye, with the reflective position and curvature selected to reflect the light from the display surface appropriately, or being tilted to a different degree.

In certain embodiments, a three-dimensional instantiation or mathematical representation of the reflective surface can be created, with, as discussed above, each region of the reflective surface being a local region having a normal that bisects the vectors from the center of that region to the center of the user's eye and to the center of a pixel in the display surface (center of the apparent position of the pixel resulting from the presence of the Fresnel lens system). As also discussed above, the radii of curvature of regions surrounding a pixel reflection can be controlled so that in combination with the collimating effects of the Fresnel lens system, a collimated (or near collimated) image reaches the user across the field of view. Through computer-based iterations, changeable parameters (e.g., local normals, local curvatures, and local spatial locations of the reflective surface and the number of elements, the powers of the elements, the curvatures of the elements, and the locations of elements for the Fresnel lens system) can be adjusted until a combination (set) of parameters is identified that provides a desired level of optical performance over the field of view, as well as a manufacturable design which is aesthetically acceptable.

During use, a non-symmetrical FS/UWA/RO surface (which, in certain embodiments, is constructed from a splined surface of multiple local regions of focus) in combination with a Fresnel lens system forms a virtual image of the at least one light emitting surface of the image display system that is stretched across a wide field of view. The FS/UWA/RO surface may be thought of as a progressive mirror or progressive curved beam splitter or a free-form mirror or reflector. As the eye scans across the field of view, both horizontally and vertically, the curved FS/UWA/RO surface shines different portions of the at least one light-emitting surface of the image display system into the user's eye. In various embodiments, the overall optical system is manufacturable in large quantities at low cost while maintaining an image quality commensurate with typical human visual resolution.

IV. HMDs That Employ Non-FS/UWA/RO Reflective Surfaces

Figure 12:
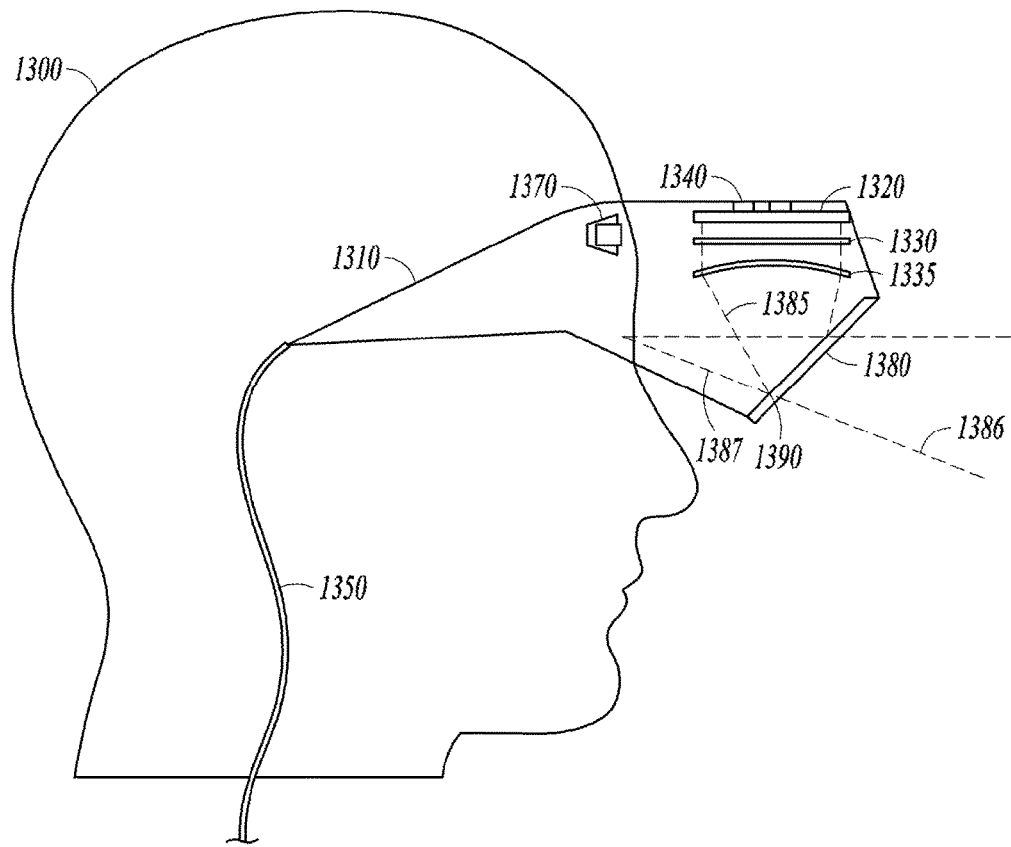
FIG. 12 is a block diagram of a side view of an augmented-reality head-mounted display apparatus having a Fresnel lens system according to an example embodiment.
Figure 13:
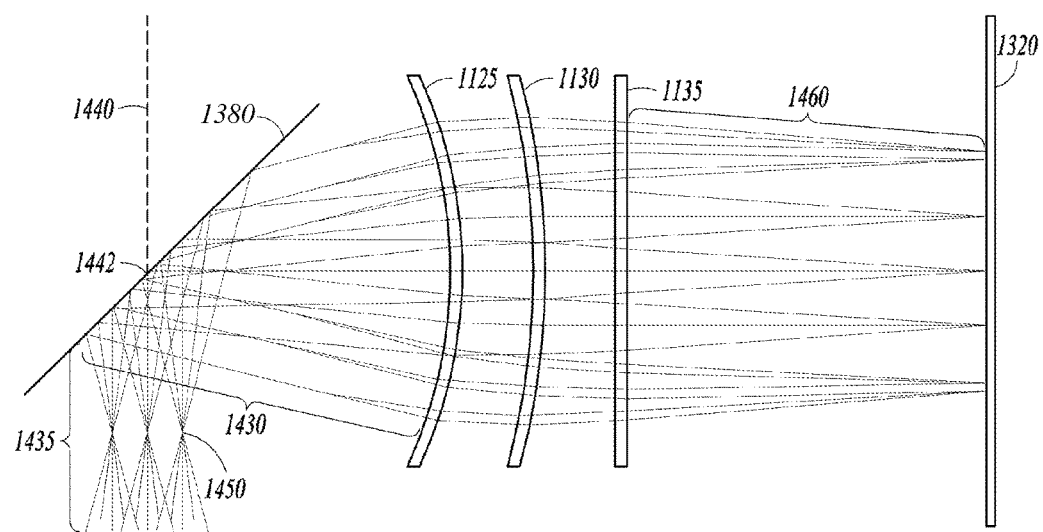
FIG. 13 is a ray diagram illustrating light rays in an augmented-reality head-mounted display apparatus of the type shown in FIG. 12.
Figure 14:
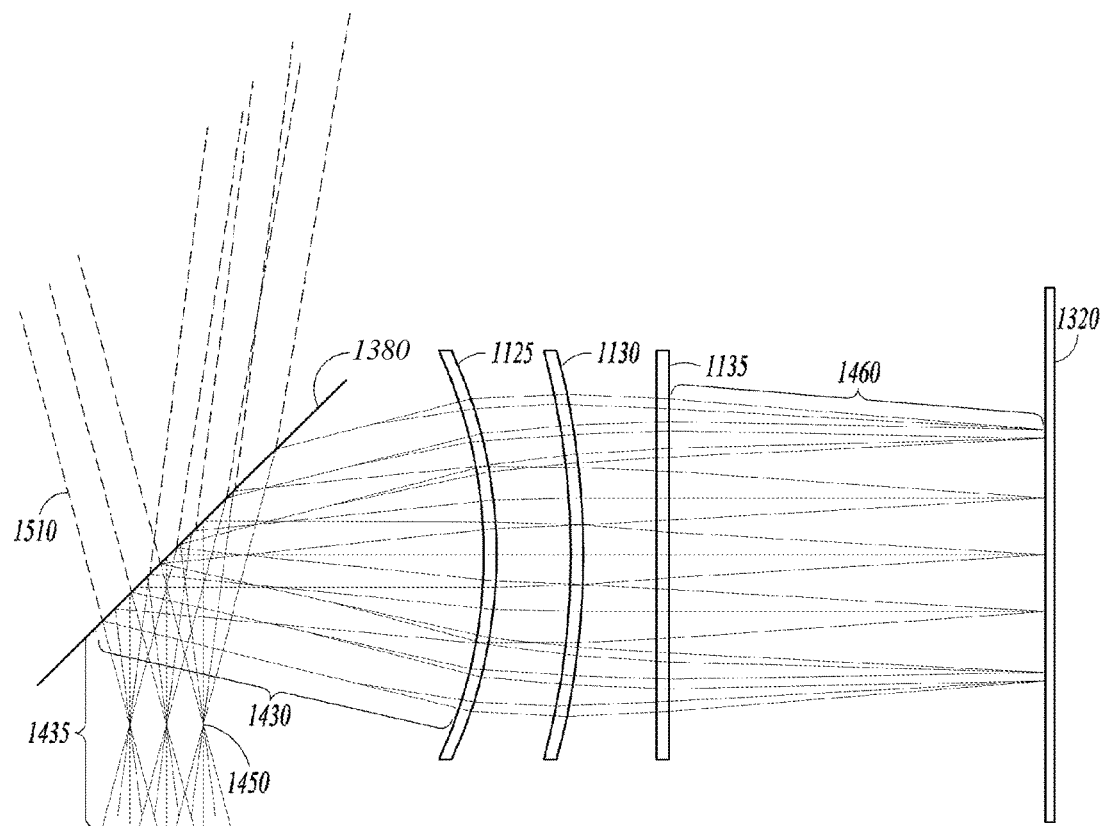
FIG. 14 is a ray diagram illustrating display and external light rays in the augmented-reality head-mounted display apparatus of FIG. 13.

As noted above, FIG. 4 shows an embodiment of a HMD optical system which uses a curved FS/UWA/RO surface and a curved Fresnel lens system. HMD optical systems that employ curved reflective surfaces that are not FS/UWA/RO surfaces, as well as those employing flat reflective surfaces, can also benefit from the use a curved Fresnel lens system between an image display system and the reflective surface. FIGS. 12-14 show an exemplary embodiment which employs a flat reflective surface and a curved Fresnel lens system.

In FIG. 12, a user 1300 is shown wearing a head-mounted display which includes an optical see-through, augmented reality binocular viewer 1310. Viewer 1310 includes at least one image display system 1320, at least one reflective surface 1380, and at least one curved Fresnel lens system that provides near viewing of the display and a wide field of view. Typically, viewer 1310 will include one display system/curved Fresnel lens system/reflective surface combination for each eye, although one or more of these components can service both eyes if desired.

As shown in FIG. 12, the curved Fresnel lens system includes Fresnel lenses 1330 and 1335. Both a flat Fresnel lens 1330 and curved Fresnel lens 1335 may be employed in various embodiments to provide a field of view of 100 degrees or more. As with the other exemplary embodiments discussed herein, more or fewer lenses than shown in FIG. 12 may be used in the curved Fresnel lens system. In one embodiment, a single curved Fresnel lens element can be used. Note that in embodiments that employ a FS/UWA/RO surface, a single Fresnel lens element, e.g., a single curved Fresnel lens element, can be used. In another embodiment, illustrated in FIGS. 13 and 14, three Fresnel lens elements 1125, 1130, and 1135 are used.

An electronics package 1340 is provided for controlling the image that is displayed by the at least one image display system 1320. The electronics package 1340 may include accelerometers and gyroscopes for locating and positioning the user. Power and video to and from the binocular viewer can be provided through a transmission cable 1350 or wireless medium. A set of cameras 1370 may be situated on opposite sides of the user's head to provide input to the HMD's software package to help control the computer generation of augmented reality scenes.

The optical see-through, augmented reality binocular viewer 1310 includes at least one reflective optical surface 1380 that allows at least one internally-generated image to overlay at least one image entering the viewer from the external environment. In particular, light 1386 enters the viewer from the external environment by passing through reflective optical surface 1380. This light combines with light 1385 from the image display system and the curved Fresnel lens system which has been reflected by reflective optical surface 1380 towards the user's eye. The result is combined light 1387 that enters the user's eye when the user looks in the direction of point 1390. The user's peripheral vision capabilities allow the user to see light from other parts of reflective optical surface 1380, distant from point 1390.

In one embodiment, as shown, the at least one image display system 1320 and the curved Fresnel lens system (e.g., Fresnel lenses 1330 and 1335) are supported above the user's eye(s) and extend in a substantially horizontal plane projecting away from the eye(s). For this embodiment, the at least one reflective optical surface 1380 can be supported by (coupled to) a bottom edge of a forward front frame section of the HMD and angled to reflect light from the at least one image projection device 1320 into the user's eye. In one embodiment, the reflective optical surface 1380 is angled such that its top end is furthest from the user's face while its lower end is closest to the user's face. If desired, the reflective optical surface can include flat (or curved) portions oriented on the side of the face.

A ray tracing analysis of a head-mounted display apparatus of the type shown in FIG. 12 is provided in FIGS. 13 and 14. The embodiment of FIGS. 13-14 uses three Fresnel lens elements 1125, 1130, and 1135, rather than the two Fresnel elements 1330 and 1335 of FIG. 12. In FIGS. 13 and 14, light rays 1430, 1435, and 1440 are shown such that light ray 1440 enters from the environment and is combined with light ray 1430 that has been reflected from reflective optical surface 1380 to create the combined light ray 1435 that enters the user's eye when the user looks in the direction of point 1442 The user's peripheral vision capabilities also allow the user to see light from other parts of reflective surface 1380, distant from point 1442.

As best seen in FIG. 14, the diverging wavefront of light 1460 emanating from the at least one image projection device 1320 is converged by a positive-diopter Fresnel lens system having Fresnel lenses 1125, 1130, and 1135 to provide zero diopter light 1430 which impinges on flat reflective optical surface 1380, where the light is bent into zero diopter light 1435 that enters the pupil of the eye. This is equivalent to light coming from a point essentially infinitely distant, and the light wavefront is flat, resulting in parallel surface normals to the wavefront, shown as rays 1435, across the entrance pupil to the eye. The reflective optical surface 1380 also admits light 1440 from the external environment (see FIG. 13), thus allowing the internal images to overlay the external images, as also shown in FIG. 14, as externally originating light beams 1510.

V. Direct View HMDs

In addition to the above applications, a curved Fresnel lens system can also be used for direct viewing of an image display system without an intervening reflective optical surface. Such a configuration will be immersive, but can include external world information through the use of one or more video cameras. By using a Fresnel lens system which comprises stacked Fresnel lenses an optical system with a short focal length and high power which can project an image of a display into a wide field of view can be achieved in a compact space.

Figure 15:
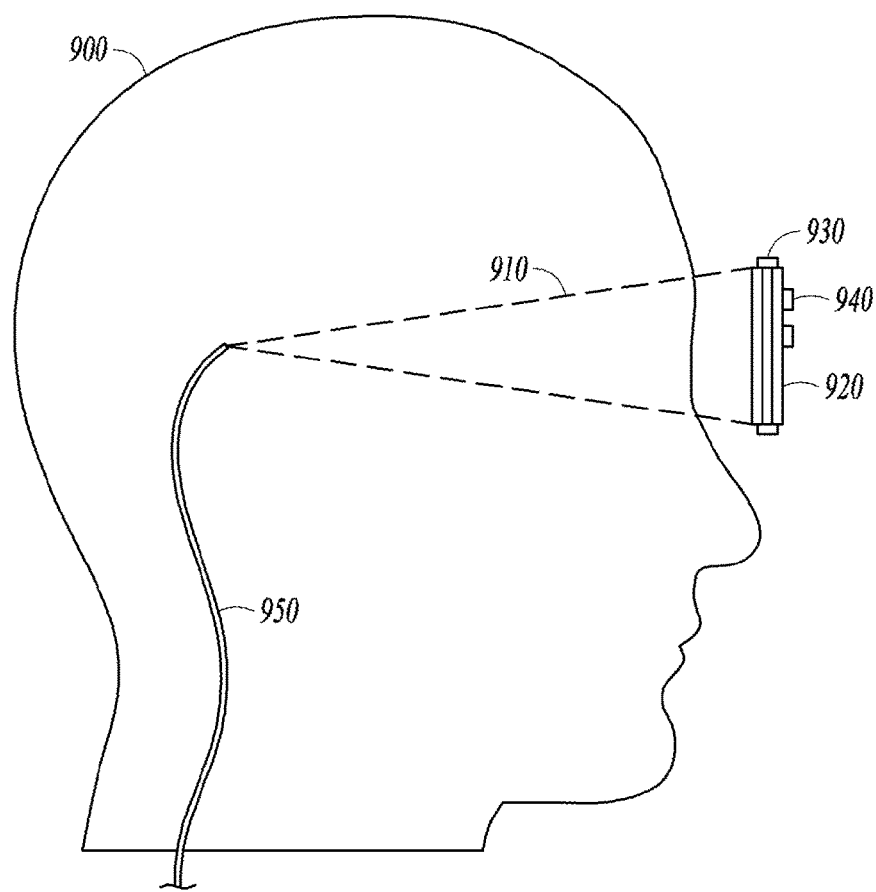
FIG. 15 is a block diagram of a side view of an immersive head-mounted display apparatus having a Fresnel lens system according to an example embodiment.
Figure 16:
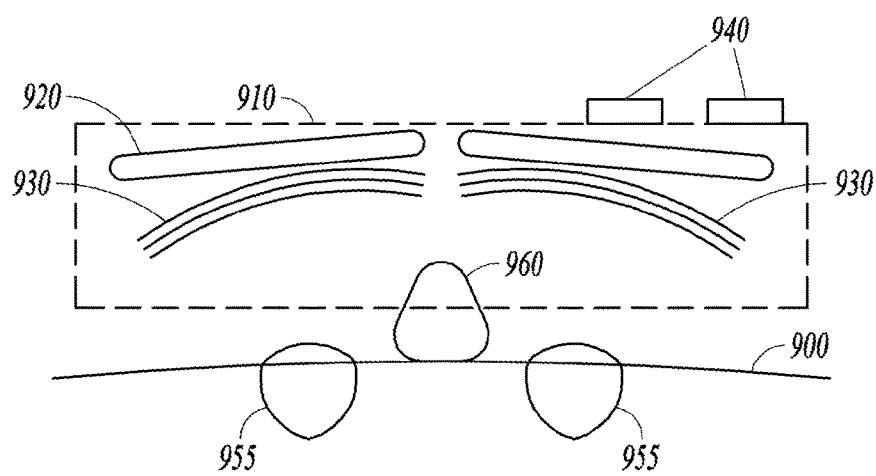
FIG. 16 is a block diagram of a top view of an immersive head-mounted display apparatus having a Fresnel lens system according to an example embodiment.

FIG. 15 is a side view representation of a user 900 wearing an immersive binocular viewer 910 in a head-mounted display. Inside the head-mounted display apparatus is at least one image display system 920 for each eye that is adjusted for near viewing with a curved Fresnel lens system 930. An electronics package 940 may include accelerometers and/or gyroscopes to control the image that is displayed and provides location, orientation and position information to synchronize images on the display with user activities. Power and video to and from the binocular viewer can be provided through a transmission cable 950 or wireless medium. A top view of the user 900 and viewers 910 is illustrated in FIG. 16, including eyes 955 and nose 960 in relation to the viewers 910. The Fresnel lenses of the Fresnel lens system 930 are stacked and curved.

In this embodiment, the at least one image display system 920 is mounted to the HMD's frame directly in front of the user's eyes and oriented essentially vertically such that the pixels emanate light directly in the direction of the user's eyes for an immersive virtual world experience. The curved Fresnel lens system 930 is arranged between the display screen of the image display system 920 and the user's eyes and allows the eye to focus on the screen in close proximity.

Figure 17:
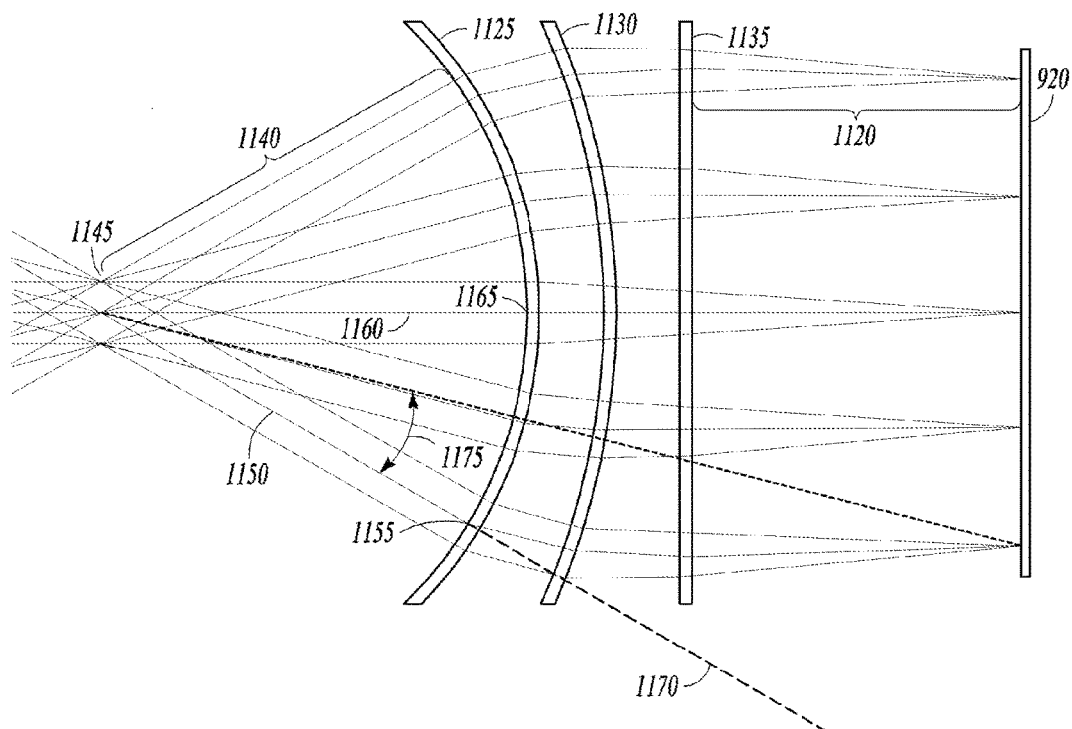
FIG. 17 is a ray diagram illustrating light rays in an immersive head-mounted display apparatus of type shown in FIGS. 15 and 16.

The operation of the head-mounted display apparatus illustrated in FIGS. 15 and 16 may be viewed using ray tracing. FIG. 17 illustrates a diverging wavefront of light 1120 emanating from the at least one image display system 920 that is collimated by a positive-diopter Fresnel lens system with Fresnel lenses 1125, 1130, and 1135, to provide approximately zero-diopter light 1140 to a pupil 1145 of a user's eye. Light 1140 is equivalent to light coming from a point essentially infinitely distant, and the light wavefront is flat, resulting in parallel surface normals to the wavefront, shown as rays 1140, across the entrance pupil 1145 to the eye.

More particularly, in FIG. 17, it is seen that the curved Fresnel lens system having Fresnel lenses 1125, 1130, and 1135 allows light 1150 passing through a field point 1155 at the edges of the Fresnel lenses 1125, 1130, and 1135 to enter the eye from a different direction than a light beam 1160 that originates at point 1165. The curved Fresnel lens system with Fresnel lenses 1125, 1130, and 1135 allows the light to look like it entered the user's field of view along a light ray path 1170. This allows an increase in the apparent field of view (the apparent angular subtense) of an amount indicated by angle 1175.

Figure 18:
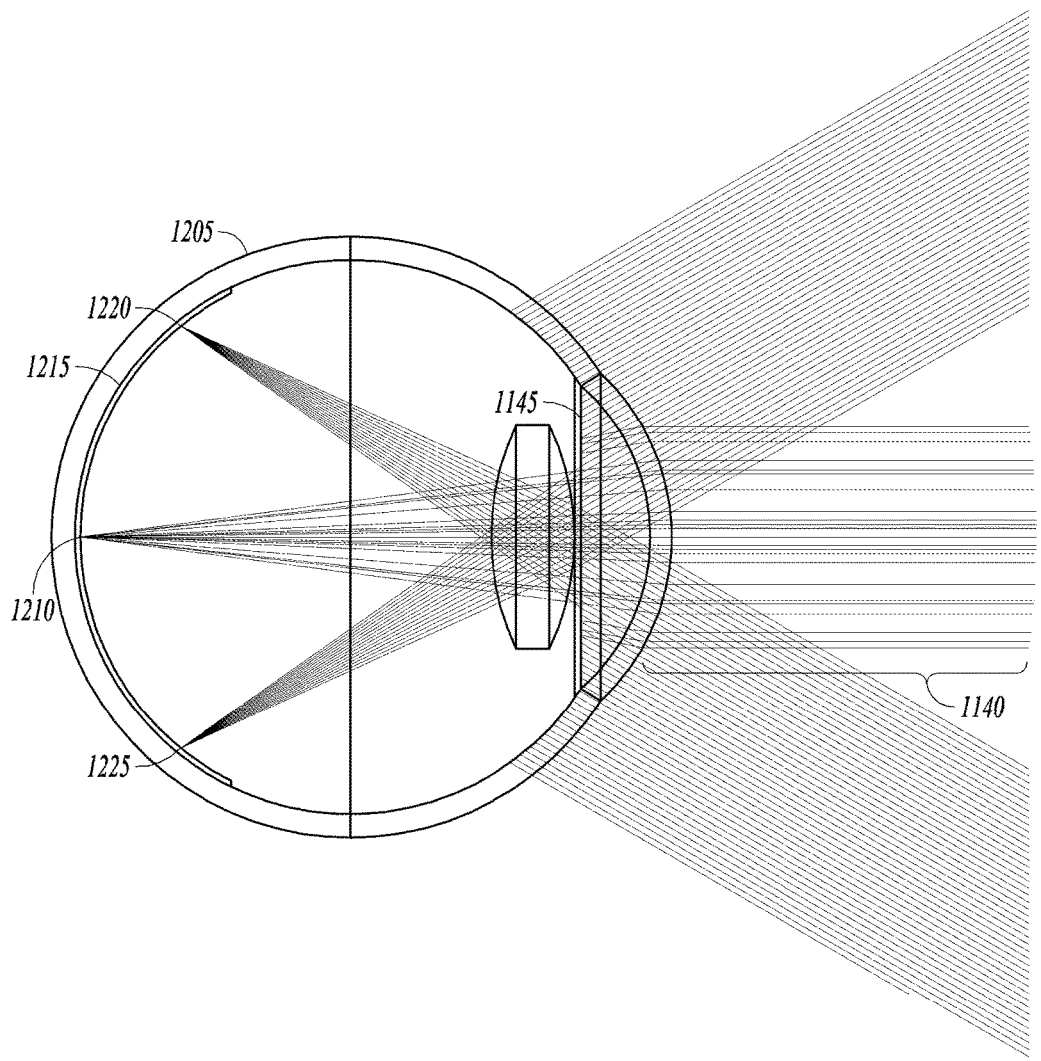
FIG. 18 is ray diagram illustrating light rays entering an eye of a user according to an example embodiment.

FIG. 18 is a ray tracing showing the collimated parallel rays 1140 entering the eye 1205 through the pupil 1145 and being focused on the fovea 1210 where the highest acuity of vision takes place. The surrounding retina 1215 responds to the wider field of view but with a lower acuity, for instance at points 1220 and 1225.

VI. General Considerations

In certain embodiments of the above aspects of the disclosure, a separate Fresnel lens system, a separate image display system, and/or a separate reflective surface (when used) is employed for each of the user's eyes. In other embodiments, the reflective optical surface (when used) contributes to the collimation (or substantial collimation) of the light from the image display system provided by the Fresnel lens system, such contribution to the collimation (or substantial collimation) being achieved through the surface's local radii of curvature.

In various embodiments, the HMD apparatus may be a binocular non-pupil-forming system in which the eye is free to move about its rolling center throughout its normally obtainable angular extents without being constrained to look through an external pupil. Prior HMD devices have alleged that they have or can provide a wide field of view, but these devices have included an external pupil that the eye must look through. Although there is a wide amount of information provided to the eye, if the eye turns the information is gone. This is the fundamental problem with pupil-forming systems which is avoided in embodiments of the present disclosure which employ reflective surfaces and, in particular, FS/UWA/RO surfaces.

In terms of the overall structure of the HMD, Table 1 sets forth representative, non-limiting, examples of the parameters which a HMD display constructed in accordance with the present disclosure will typically meet. In addition, the HMD displays disclosed herein will typically have an inter-pixel distance that is small enough to ensure that a cogent image is established in the visual plane of the user.

Various features that can be included in the head-mounted displays disclosed herein include, without limitation, the following, some of which have been referenced above:

(1) In some embodiments, the reflective optical surface (when used) may be semi-transparent, allowing light to come in from the external environment. The internal display-generated images can then overlay the external image. The two images may be aligned through the use of localization equipment, such as gyroscopes, cameras, and software manipulation of the computer-generated imagery so that the virtual images are at the appropriate locations in the external environment. In particular, a camera, accelerometer, and/or gyroscopes can be used to assist the apparatus in registering where it is in the physical reality and to superimpose its images on the outside view. In these embodiments, the balance between the relative transmittance and reflectance of the reflective optical surface can be selected to provide the user with overlaid images with appropriate brightness characteristics. Also in these embodiments, the real world image and the computer-generated image can appear to both be at approximately the same apparent distance, so that the eye can focus on both images at once.

(2) In some embodiments, the reflective optical surface (when used) is kept as thin as possible in order minimize effects on the position or focus of external light passing through the surface.

(3) In some embodiments, the head-mounted display apparatus provides a field of view to each eye of at least 100 degrees, at least 150 degrees, or at least 200 degrees.

(4) In some embodiments, the field of view provided by the head-mounted display to each eye does not overlap the user's nose by any large degree.

(5) In some embodiments, the reflective optical surface (when used) may employ a progressive transition of its optical prescription across the field of view to maintain focus on the available display area.

(6) In some embodiments, ray tracing may be used to customize apparatus parameters for a particular implementation, such as military training, flight simulation, gaming and other commercial applications.

(7) In some embodiments, the reflective optical surface (when used) and/or the surface of the display, as well as the properties and locations of the Fresnel lenses, and the distances between the display and the reflective optical surface (when used) and between the reflective optical surface (when used) and the eye, can be manipulated with respect to a Modulation Transfer Function (MTF) specification at the retina and/or the fovea.

(8) In some embodiments, the HMDs disclosed herein can be implemented in applications such as, but not limited to, sniper detection, commercial training, military training and operations, and CAD manufacturing.

(9) Although shown as flat in the figures, the image display system may also have a curved light-emitting surface.

Once designed, the reflective optical surfaces disclosed herein (e.g., the FS/UWA/RO surfaces) can be produced e.g., manufactured in quantity, using a variety of techniques and a variety of materials now known or subsequently developed. For example, the surfaces can be made from plastic materials which have been metalized to be suitably reflective. Polished plastic or glass materials can also be used. For "augmented reality" applications, the reflective optical surfaces can be constructed from a transmissive material with embedded small reflectors thus reflecting a portion of an incident wavefront while allowing transmission of light through the material. With specific regard to the curved Fresnel lens systems disclosed herein, the one or more curved Fresnel lenses of those systems may be obtained already curved or made from curvable material, such as curvable glass or plastic to allow curving at assembly time.

For prototype parts, an acrylic plastic (e.g., plexiglas) may be used with the part being formed by diamond turning. For production parts, either acrylic or polycarbonate may, for example, be used with the part being formed by, for example, injection molding techniques. A minimum thickness of 2 mm at the edge may be used, requiring commensurately sized Fresnel components. A typical Fresnel facet width can be about 200 microns. The reflective optical surface may be described as a detailed Computer Aided Drafting (CAD) description or as a non-uniform rational B-Spline NURBS surface, which can be converted into a CAD description. Having a CAD file may allow the device to be made using 3-D printing, where the CAD description results in a 3D object directly, without requiring machining.

The mathematical techniques discussed above can be encoded in various programming environments and/or programming languages, now known or subsequently developed. A currently preferred programming environment is the Java language running in the Eclipse Programmer's interface. Other programming environments such as Microsoft Visual C# can also be used if desired. Calculations can also be performed using the Mathcad platform marketed by PTC of Needham, Mass., and/or the Matlab platform from MathWorks, Inc., of Natick, Mass. The resulting programs can be stored on a hard drive, memory stick, CD, or similar device. The procedures can be performed using typical desktop computing equipment available from a variety of vendors, e.g., DELL, HP, TOSHIBA, etc. Alternatively, more powerful computing equipment can be used including "cloud" computing if desired.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

TABLE 1

| Name | Description | Units | Minimum | Maximum |
|---|---|---|---|---|
| Distance of reflective surface from eye | | mm | 10 | 400 |
| Distance of reflective surface from display | | mm | 10 | 400 |
| Display size | Horizontal | mm | 9 | 100 |
| | Vertical | mm | 9 | 100 |
| Display resolution | Horizontal | pixels | 640 | 1920+ |
| | Vertical | pixels | 480 | 1080+ |
| HMD weight | | grams | 1 | 1000 |
| HMD size | Distance in front of face | mm | 10 | 140 |
| Human pupil size | | mm | 3 to 4 | 5 to 9 |
| Size of reflective surface | e.g., less than the width of the head/2 | mm | 30 | 78 |
| Number of reflective surfaces | | units | 1 | 3+ |
| Maximum illumination to the eye | e.g., bright enough to allow viewing on bright sunny day | fc, footcandles | 5,000 | 10,000 |
| Battery life | | hours | 3 | 4 |
| Optical resolution | Largest angular blur | arcminute RMS blur diameter | 1 | 10 |
| | Estimated number of line pairs of resolution | | 1 | 5 |
| Maximum variation in apparent brightness of the image | | Percent | 0 | 20 |
| Maximum image distortion | | Percent | 0 | 5 |
| Estimated maximum derivative of brightness | | Percent/degree | 0 | 5 |

What is claimed is:

1. A head-mounted display apparatus comprising:

(I) a frame adapted to be mounted on a head of a nominal user;

(II) an image display system supported by the frame and comprising at least one light-emitting surface;

(III) a free-space, ultra-wide angle, non-diffractive, and reflective optical surface supported by the frame, the reflective optical surface being a continuous surface and configured to converge light toward an eye of the nominal user; and (IV) a Fresnel lens system supported by the frame, the Fresnel lens system being configured to receive light emitted by the image display system directly from the image display system without any intervening optical component between the Fresnel lens system and the image display system and to refract the light in a direction toward the free-space, ultra-wide angle, reflective optical surface, the Fresnel lens system being positioned outside of a path of the light between the reflective optical surface and the eye of the nominal user, a Fresnel lens element of the Fresnel lens system comprising a first side comprising a non-planar curved surface having concentric rings and a second side comprising a non-planar continuous surface; and wherein the free-space, ultra-wide angle, reflective optical surface receives the light directly from the Fresnel lens element of the Fresnel lens system with no intervening optical component in a path of the light from the Fresnel lens element and the reflective optical surface, wherein the reflective optical surface and the Fresnel lens system produce spatially-separated virtual images of spatially-separated portions of the at least one light-emitting surface, at least one of the spatially-separated virtual images being angularly separated from at least one other of the spatially-separated virtual images by at least 100 degrees, the angular separation being measured from a center of rotation of the eye of the nominal user.

2. The head-mounted display apparatus of claim 1 wherein the at least one of the spatially-separated virtual images is angularly separated from the at least one other of the spatially-separated virtual images by at least 150 degrees and wherein the angular separation is up to a widest field of view for a direction of gaze.

3. The head-mounted display apparatus of claim 2 wherein the angular separation up to a widest field of view for a direction of gaze is about 200 degrees.

4. The head-mounted display apparatus of claim 1 wherein the at least one of the spatially-separated virtual images is angularly separated from the at least one other of the spatially-separated virtual images by at least 200 degrees and wherein the angular separation is up to a widest field of view of a direction of gaze.

5. The head-mounted display apparatus of claim 1 wherein the free-space, ultra-wide angle, reflective optical surface is semi-transparent.

6. The head-mounted display apparatus of claim 1 wherein the Fresnel lens system is configured to at least partially collimate light emitted from the image display device's light-emitting surface.

7. The head-mounted display apparatus of claim 1 wherein the free-space, ultra-wide angle, reflective optical surface is configured to partially collimate light emitted from the image display device's light-emitting surface.

8. The head-mounted display apparatus of claim 1 wherein the Fresnel lens element is concave towards the free-space, ultra-wide angle, reflective optical surface.

9. The head-mounted display apparatus of claim 1 wherein the Fresnel lens system comprises a plurality of Fresnel lens elements in a stacked configuration.

10. The head-mounted display apparatus of claim 1 wherein the Fresnel lens system comprises at least one Fresnel lens element having a plurality of facets that are separated from another by edges wherein at least some of the edges lie along radial lines that (i) pass through a center of rotation of the eye of the nominal user, or (ii) pass through the center of a natural lens of the eye of the nominal user, or (iii) are normal to a surface of a cornea of the eye of the nominal user.

11. The head-mounted display apparatus of claim 1 wherein the angular separation up to a widest field of view for a direction of gaze is about 200 degrees.

12. The head-mounted display apparatus of claim 1, wherein the free-space, ultra-wide angle, reflective optical surface is a non-planar surface, and is further configured to reflect and converge light received from the at least one light-emitting surface toward one eye of the nominal user; and the angular separation of the at least one of the spatially-separated virtual images and the at least one other of the spatially-separated virtual images being measured from the center of rotation of the one eye of the nominal user.

13. A head-mounted display apparatus comprising:
(I) a frame adapted to be mounted on a head of a nominal user;
(II) an image display system supported by the frame;
(III) a non-diffractive and continuous reflective surface supported by the frame; and
(IV) a Fresnel lens system supported by the frame, the Fresnel lens system being configured to receive light emitted by the image display system directly from the image display system without any intervening optical component between the Fresnel lens system and the image display system and to refract light emitted by the image display system toward the reflective surface, the Fresnel lens system positioned outside of a path of the light between the reflective surface and an eye of the nominal user, a Fresnel lens element of the Fresnel lens system comprising a first side comprising a non-planar curved surface having concentric rings and a second side comprising a non-planar continuous surface.

14. The head-mounted display apparatus of claim 13 wherein the reflective surface and the Fresnel lens system provide a field of view to the nominal user of at least 100 degrees and up to a widest field of view for a direction of gaze.

15. The head-mounted display apparatus of claim 14 wherein the angular separation up to a widest field of view for a direction of gaze is about 200 degrees.

16. The head-mounted display apparatus of claim 13 wherein the reflective surface is semi-transparent.

17. The head-mounted display apparatus of claim 13 wherein the Fresnel lens system is configured to at least partially collimate light emitted from the image display system.

18. The head-mounted display apparatus of claim 13 wherein the reflective surface is configured to partially collimate light emitted from the image display system.

19. The head-mounted display apparatus of claim 13 wherein the Fresnel lens element is concave towards the reflective surface.

20. The head-mounted display apparatus of claim 13 wherein the Fresnel lens element comprises a plurality of facets that are separated from another by edges wherein at least some of the edges lie along radial lines that (i) pass through a center of rotation of the eye of the nominal user, or (ii) pass through a center of natural lens of the eye of the nominal user, or (iii) are normal to a surface of a cornea of the eye of the nominal user.

21. A head-mounted display apparatus comprising:
(I) a frame adapted to be mounted on a head of a nominal user;
(II) an image display system supported by the frame; and
(III) a Fresnel lens system supported by the frame;
wherein:
the Fresnel lens system comprises at least two Fresnel lens elements in a stacked configuration through which light emitted by the image display system is twice refracted, the Fresnel lens system configured to receive light directly from the image display system without any intervening optical component between the Fresnel lens system and the image display system and to refract light emitted by the image display system toward an eye of the nominal user, wherein each Fresnel lens element of the at least two Fresnel lens elements comprises a first side comprising a non-planar curved surface having concentric rings and a second side comprising a non-planar continuous surface.

22. The head-mounted display apparatus of claim 21 wherein the Fresnel lens system is located on an axis extending perpendicularly from a plane of the image display system between the image display system and a reflective optical surface.

23. The head-mounted display apparatus of claim 21 wherein the Fresnel lens system comprises at least one Fresnel lens element having a plurality of facets that are separated from another by edges wherein at least some of the edges lie along radial lines that (i) pass through a center of rotation of the eye of the nominal user, or (ii) pass through a center of a natural lens of the eye of the nominal user, or (iii) are normal to a surface of a cornea of the eye of the nominal user.

24. The head-mounted display apparatus of claim 23 wherein all of the edges lie along radial lines that (i) pass through the center of rotation of the eye of the nominal user, or (ii) pass through the center of the natural lens of the eye of the nominal user, or (iii) are normal to the surface of the cornea of the eye of the nominal user.

* * * * *